US012782522B2

(12) United States Patent
Tanaka et al.

(10) Patent No.: US 12,782,522 B2
(45) Date of Patent: Nov. 3, 2026

(54) LIGHT OUTPUT CONTROL DEVICE, LIGHT OUTPUT CONTROL METHOD, AND PROGRAM

(71) Applicant: Sony Group Corporation, Tokyo (JP)

(72) Inventors: Hirotaka Tanaka, Tokyo (JP); Shoji Matsuda, Tokyo (JP); Katsunori Honma, Tokyo (JP); Satoshi Suzuki, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 606 days.

(21) Appl. No.: 18/264,760

(22) PCT Filed: Jan. 20, 2022

(86) PCT No.: PCT/JP2022/001990
§ 371 (c)(1),
(2) Date: Aug. 9, 2023

(87) PCT Pub. No.: WO2022/181129
PCT Pub. Date: Sep. 1, 2022

(65) Prior Publication Data

US 2024/0118394 A1 Apr. 11, 2024

(30) Foreign Application Priority Data

Feb. 24, 2021 (JP) ................................ 2021-027090

(51) Int. Cl.
*G01S 7/484* (2006.01)
*G01S 17/931* (2020.01)

(52) U.S. Cl.
CPC ........... *G01S 7/484* (2013.01); *G01S 17/931* (2020.01)

(58) Field of Classification Search
CPC .... G06V 20/584; G06V 20/58; G06V 20/582; G06V 20/588; G06V 10/147;
(Continued)

(56) References Cited

U.S. PATENT DOCUMENTS

2018/0205926 A1* 7/2018 Mogalapalli ......... H04N 13/128
2018/0275278 A1* 9/2018 Yamada ................. G01C 3/085
2023/0063215 A1* 3/2023 Kadam ................ H04N 13/282

FOREIGN PATENT DOCUMENTS

JP 2001091232 A * 4/2001
JP 2001338280 A * 12/2001
(Continued)

OTHER PUBLICATIONS

International Search Report and Written Opinion mailed on Apr. 19, 2022, received for PCT Application PCT/JP2022/001990, filed on Jan. 20, 2022, 8 pages including English Translation.

*Primary Examiner* — Masum Billah
(74) *Attorney, Agent, or Firm* — XSENSUS LLP

(57) ABSTRACT

There are provided a device and a method that execute light output control that eliminates an occlusion region and does not disturb blinking pattern light of a mobile device. At least one of a light application region or a light output timing of output light of a light output unit is determined on the basis of a data analysis result based on sensor input information and reception information from another device, the light output unit is controlled according to the light application region or the light output timing that has been determined, and a light output process is executed. Specifically, for example, light output control is executed so as to eliminate an occlusion region which no light reaches due to a pillar or the like, and moreover, so as not to disturb blinking pattern light output from the mobile device.

16 Claims, 35 Drawing Sheets

(58) Field of Classification Search
CPC .. G06V 20/56; G06V 2201/10; G06V 10/141; G06V 10/143
USPC ........................................................... 356/5
See application file for complete search history.

(56) References Cited

FOREIGN PATENT DOCUMENTS

| | | | | |
|---|---|---|---|---|
| JP | 2013224895 | A | * | 10/2013 |
| JP | 2020-514713 | A | | 5/2020 |
| WO | 2018/042801 | A1 | | 3/2018 |
| WO | 2018/212292 | A1 | | 11/2018 |

* cited by examiner

LIGHT OUTPUT CONTROL DEVICE, LIGHT OUTPUT CONTROL METHOD, AND PROGRAM

CROSS-REFERENCE TO RELATED APPLICATIONS

The present application is based on PCT filing PCT/JP2022/001990, filed Jan. 20, 2022, which claims priority to Japanese Patent Application No. 2021-027090, filed Feb. 24, 2021, the contents of each are incorporated herein by reference.

TECHNICAL FIELD

The present disclosure relates to a light output control device, a light output control method, and a program. More specifically, the present disclosure relates to a light output control device, a light output control method, and a program that execute a light output control process that enables highly accurate autonomous traveling of a mobile device such as an autonomous traveling robot.

BACKGROUND ART

In recent years, development of robots and vehicles that travel autonomously has been actively performed.

For example, a robot or a vehicle that moves autonomously measures the distance to an object such as various obstacles in a traveling direction by using sensor detection information, sets a traveling route so as not to collide with the obstacle, and travels.

Sensing in a robot or a vehicle that travels autonomously is a very important technology, and in particular, a depth sensor that measures an object distance is an essential configuration for recognizing a situation of the outside world and controlling an action according to the result.

There are various methods for detecting an object distance by a sensor.

For example, Patent Document 1 (International Publication No. 2018/042801) discloses a ranging scheme in an imaging device.

The ranging scheme described in Patent Document 1 discloses a configuration in which a highly accurate object distance is calculated by combining two different ranging schemes, that is, a time of flight (ToF) scheme in which an object distance is calculated by measuring a round-trip time of light from when light is applied to an object to when reflected light from the object is received, and a pattern light analysis scheme in which the object distance is calculated by analysis of pattern light applied to the object.

A certain ranging sensor, that is, a depth sensor is mounted on a robot or a vehicle that travels autonomously according to its application.

As a scheme of the depth sensor, for example, in addition to the above-described time of flight (ToF), there is light detection and ranging (LiDAR) in which an object distance is calculated by measuring a round-trip time of laser light from when the laser light is applied to an object to when the laser light is reflected by the object, similarly to the ToF. Moreover, there is a stereo camera scheme in which an object distance is calculated by parallax analysis using captured images from viewpoints at a plurality of different locations.

Note that, in a case where the stereo camera scheme is used, it is difficult to perform parallax analysis on a wall or the like with a little texture. Therefore, a process of applying light including a texture design (texture pattern light) and analyzing a captured image of the texture pattern light is performed.

As described above, the principle of many depth sensors is to calculate an object distance by analyzing reflected light of the light applied to a ranging target object or by analyzing the captured image of the ranging target object.

However, applied light may be blocked by a pillar or the like existing in a traveling environment. In this case, it is difficult to calculate the object distance in a region (occlusion region (shadow region)) which no applied light reaches.

Furthermore, in an environment in which a plurality of robots simultaneously travels and each robot operates the depth sensor of the robot itself, there is a possibility that applied light of the sensors of the respective robots intersects with each other and output light of various sensors is input to other various sensors, and as a result, there is a possibility that ranging accuracy of each sensor is deteriorated.

For example, when light emitted from the ToF sensor being used by a robot A and light emitted from the LiDAR sensor being used by a robot B overlap each other and are applied to the same object, a signal (S/N ratio) detected by a light receiving unit of the sensor of each robot is weakened, and as a result, the ranging accuracy is deteriorated.

Furthermore, if light sent from another sensor is recognized as applied light from its own sensor and distance calculation is performed, a wrong distance value is calculated.

CITATION LIST

Patent Document

Patent Document 1: International Publication No. 2018/042801

SUMMARY OF THE INVENTION

Problems to be Solved by the Invention

The present disclosure has been made in view of the problems described above, for example, and relates to a light output control device, a light output control method, and a program that execute a light output control process that enables highly accurate object distance calculation in a mobile device such as a robot and enables the mobile device to autonomously travel highly accurately even in a case where applied light is blocked by a pillar or the like existing in a traveling environment of the mobile device.

Solutions to Problems

A first aspect of the present disclosure is a light output control device including:

a data analysis unit that performs data analysis based on sensor input information;

a processing determination unit that determines at least one of a light application region or a light output timing of output light of a light output unit on the basis of an analysis result of the data analysis unit; and a control unit that controls the light output unit according to at least one of the light application region or the light output timing determined by the processing determination unit and executes a light output process.

Moreover, a second aspect of the present disclosure is a light output control method executed in a light output control device, the method including:

a data analysis step of causing a data processing unit to perform data analysis based on sensor input information;

a processing determination step of causing the data processing unit to determine at least one of a light application region or a light output timing of output light of a light output unit on the basis of an analysis result in the data analysis step; and a light output control step of causing the data processing unit to control the light output unit according to at least one of the light application region or the light output timing determined in the processing determination step and to execute a light output process.

Moreover, a third aspect of the present disclosure is a program causing a light output control process to be executed in a light output control device, the program causing a data processing unit to execute:

a data analysis step of performing data analysis on the basis of sensor input information;

a processing determination step of determining at least one of a light application region or a light output timing of output light of a light output unit on the basis of an analysis result in the data analysis step; and a light output control step of controlling the light output unit according to at least one of the light application region or the light output timing determined in the processing determination step and causing a light output process to be executed.

Note that a program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Still other objects, features, and advantages of the present disclosure will become apparent from a more detailed description based on embodiments of the present disclosure described below and the accompanying drawings. Note that a system in the present Description is a logical set configuration of a plurality of devices, and is not limited to one in which devices with respective configurations are in the same housing.

According to a configuration of an embodiment of the present disclosure, a device and a method are realized that execute light output control that eliminates an occlusion region and does not disturb blinking pattern light of a mobile device.

Specifically, for example, at least one of a light application region or a light output timing of output light of the light output unit is determined on the basis of a data analysis result based on sensor input information and reception information from another device, the light output unit is controlled according to the light application region or the light output timing that has been determined, and a light output process is executed. Specifically, for example, light output control is executed so as to eliminate an occlusion region which no light reaches due to a pillar or the like, and moreover, so as not to disturb blinking pattern light output from the mobile device.

According to the present configuration, a device and a method are realized that execute light output control that eliminates an occlusion region and does not disturb blinking pattern light of the mobile device.

Note that effects described in the present Description are merely examples and are not limited, and additional effects may be provided.

MODE FOR CARRYING OUT THE INVENTION

Figure 1:
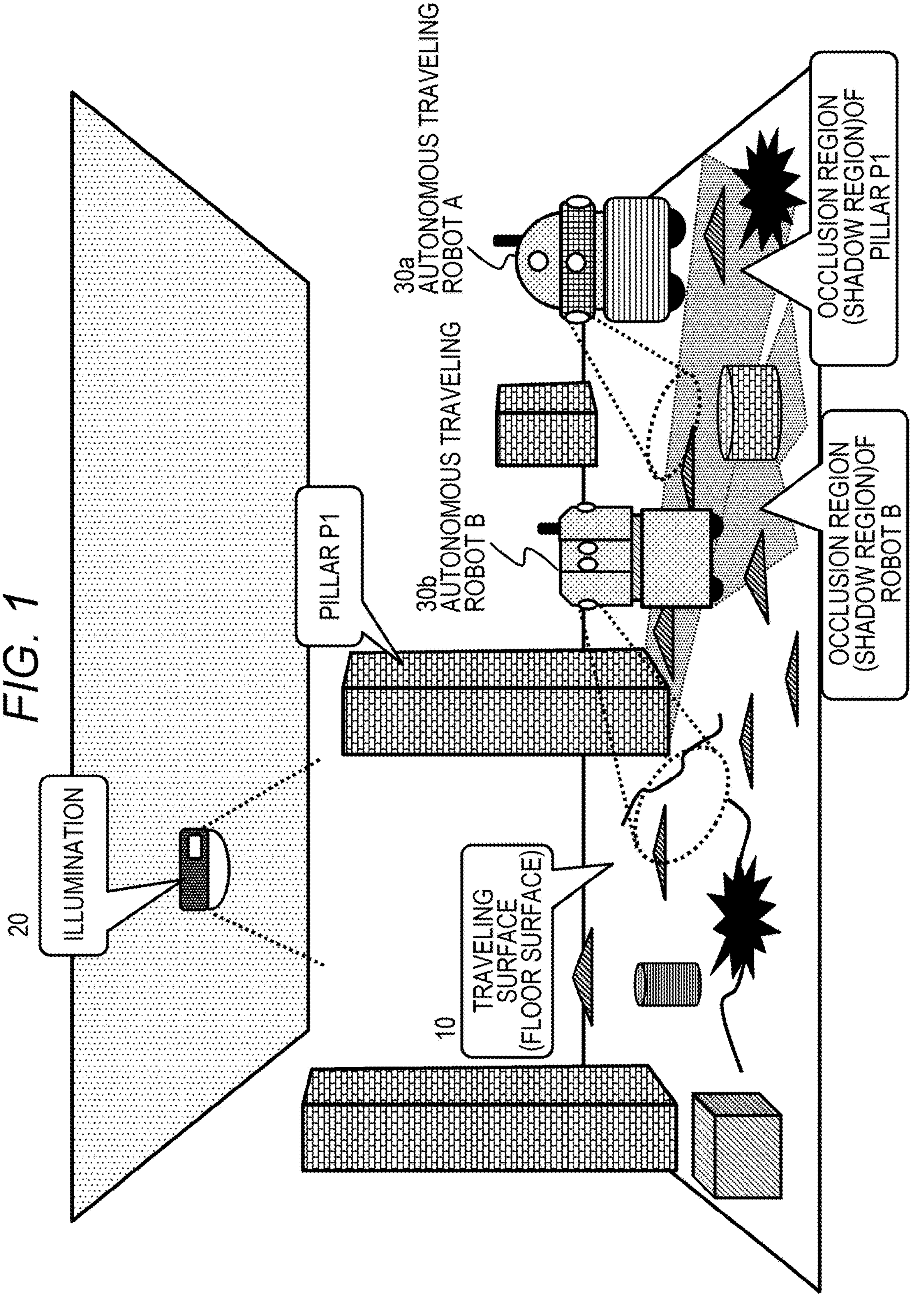
FIG. 1 is a view for explaining a travel environment and problems of a mobile device such as a robot.

Hereinafter, details of a light output control device, a light output control method, and a program of the present disclosure will be described with reference to the drawings. Note that the description will be given according to the following items.

1. Travel environment and problems of mobile device such as robot
2. Outline of configuration of and processing to be executed by light output control device of present disclosure
3. Specific examples of configuration of and processing by light output control device of present disclosure
4. Configuration and processing of robot
5. Sequence of light output control process executed by light output control device of present disclosure
6. Other embodiments
7. Hardware configuration example of light output control device
8. Conclusion of configuration of present disclosure

1. Travel Environment and Problems of Mobile Device Such as Robot

First, a travel environment and problems of a mobile device such as a robot will be described with reference to FIG. 1.

FIG. 1 illustrates a plurality of robots, that is, an autonomous traveling robot A, 30*a* and an autonomous traveling robot B, 30*b*. These robots travel on a traveling surface 10.

There are pillars, obstacles, and the like on the traveling surface 10, and each robot measures the distance to an obstacle or the like in the traveling direction by using detection information obtained by a sensor provided in the robot, selects and travels on a route on which the robot does not collide with the obstacle.

Each of the autonomous traveling robot A, 30*a* and the autonomous traveling robot B, 30*b* includes, for example, a stereo camera as a sensor (depth sensor) for detecting an object distance.

The stereo camera is a depth sensor that calculates an object distance by parallax analysis based on a plurality of captured images captured from a plurality of viewpoints.

For example, feature point matching, which is a process of associating feature points included in a plurality of captured images captured from a plurality of viewpoints with each other, is performed, and the object distance is calculated on the basis of a positional shift of images of corresponding feature points in the respective images.

However, in a case where object distance is calculated by using such a stereo camera, it is necessary to capture a clear image.

For example, since it is difficult to capture a clear image in a dark environment, a process of adjusting the image capturing environment by outputting illumination light from illumination 20 as illustrated in FIG. 1 is often performed.

With such a configuration, it is possible to capture a clear image by using the stereo camera of the robot in a bright environment, and highly accurate object distance calculation is realized.

Note that, in a case where a stereo camera is used as the depth sensor, it is difficult to detect a feature point on a wall or the like with a little small texture, and it is difficult to perform parallax analysis by feature point matching. Therefore, a process of applying light (texture pattern light) including a texture design and analyzing a captured image of the texture pattern light is performed.

For example, also the illumination 20 illustrated in the drawing applies texture pattern light including a texture design.

By applying the texture pattern light including the texture design, a specific design (texture) is applied to, for example, a white floor or wall, and feature point detection becomes easy. As a result, parallax analysis by feature point matching can be performed with high accuracy, and the object distance can be calculated with high accuracy by analyzing the image captured by the depth sensor (stereo camera) of the robot.

However, in the configuration as illustrated in FIG. 1, applied light from the illumination 20 is blocked by various objects, and many occlusion regions (shadow regions) are formed. For example, the pillar P1 illustrated in the drawing blocks applied light from the illumination 20 and forms an occlusion region (shadow region) of the pillar P1. Similarly, the autonomous traveling robot B, 30*b* also blocks applied light from the illumination 20 and forms an occlusion region (shadow region).

In a case where the illumination 20 applies light including a texture design, the texture pattern is not applied to these occlusion regions (shadow regions).

As a result, it is difficult for the autonomous traveling robot A, 30*a* to analyze the distance to and the shape of an object including the floor surface in the occlusion region (shadow region) with high accuracy, and the autonomous traveling robot A, 30*a* cannot travel safely in some cases.

The light output control device and the light output control method of the present disclosure solve such a problem, for example.

Hereinafter, details of the light output control device and the light output control method of the present disclosure will be sequentially described.

2. Outline of Configuration of and Processing to be Executed by Light Output Control Device of Present Disclosure An outline of configuration of and processing executed by the light output control device of the present disclosure will be described with reference to FIG. 2 and subsequent drawings.

Similarly to FIG. 1 described above, FIG. 2 illustrates a plurality of robots, that is, the autonomous traveling robot A, 30*a* and the autonomous traveling robot B, 30*b*. These robots travel on a traveling surface 10.

There are pillars, obstacles, and the like on the traveling surface 10, and each robot measures the distance to an obstacle or the like in the traveling direction and the three-dimensional shape of the floor by using detection information obtained by the sensor provided in the robot, selects and travels on a route on which the robot does not collide with the obstacle and a flat route.

Similarly to what was described with reference to FIG. 1, each of the autonomous traveling robot A, 30*a* and the autonomous traveling robot B, 30*b* includes, for example, a stereo camera as a sensor (depth sensor) for detecting an object distance.

As described above, the stereo camera is a depth sensor that calculates an object distance by parallax analysis based on captured images from a plurality of viewpoints.

However, as described above, it is difficult to capture a clear image in a dark environment, for example.

Figure 2:
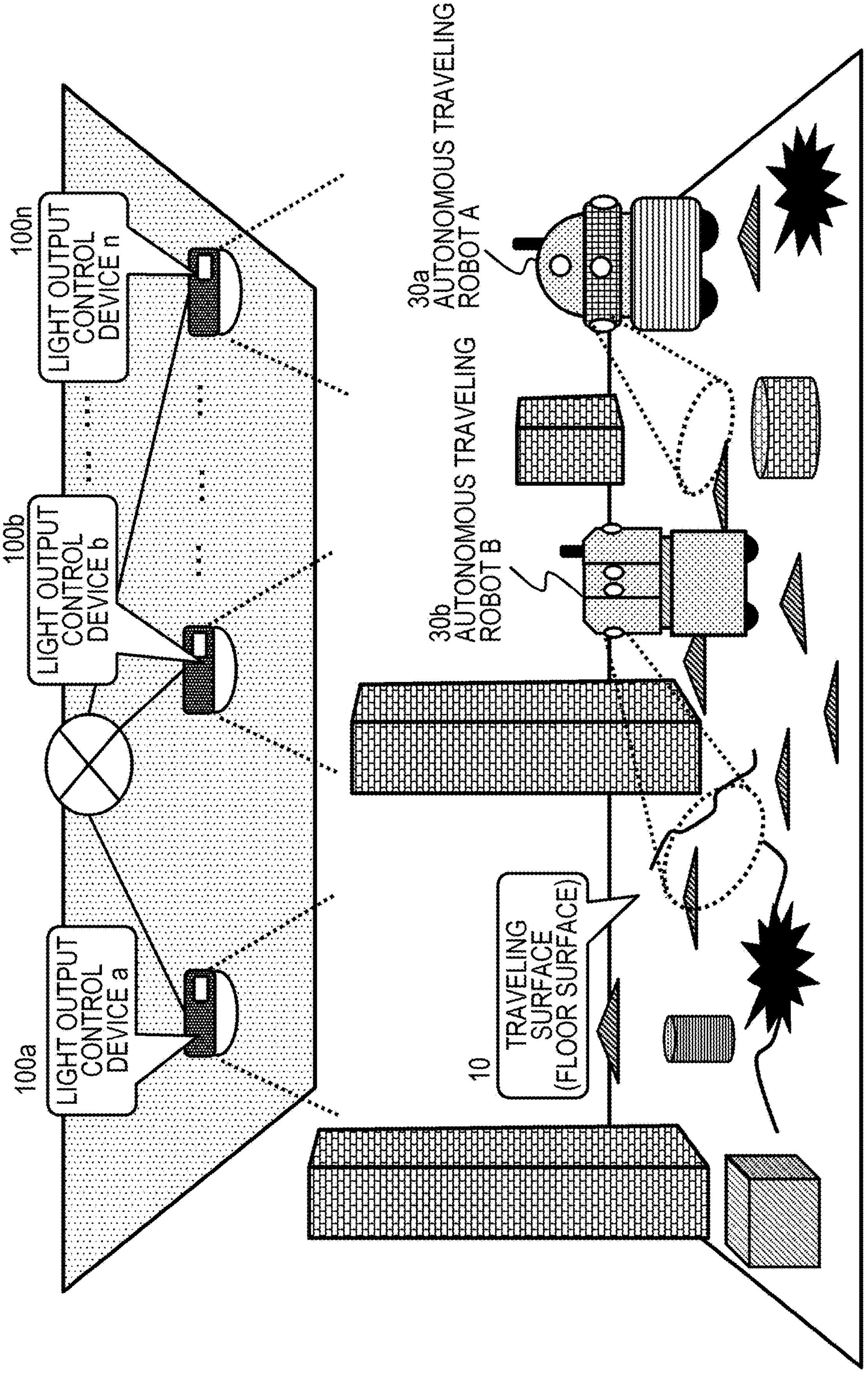
FIG. 2 is a diagram for explaining an outline of configuration of and processing to be executed by a light output control device of the present disclosure.

In the present disclosure, as illustrated in FIG. 2, a plurality of light output control devices a, 100*a* to *n*, 100*n* are used, and each of the light output control devices a to n, 100*a* to *n* outputs light.

Each of the plurality of light output control devices a to n, 100*a* to *n* outputs light, and therefore it is possible to capture a clear image by the stereo camera of the robot in a bright environment.

Note that the light output control devices a to n, 100*a* to *n* are connected to one another by a communication network and can communicate with one another.

As described above with reference with FIG. 1, in a case where a stereo camera is used as the depth sensor, it is difficult to perform parallax analysis on a wall or the like with a little texture. Therefore, a process of applying texture pattern light including a texture design and analyzing a captured image of the texture pattern light is performed.

The plurality light output control devices a to n, 100*a* to *n* illustrated in the drawing applies light including a texture design.

The depth sensor (stereo camera) of each robot analyzes the object image of the floor or the like to which the texture pattern light is applied, and therefore can analyze the distance to or the three-dimensional shape of the object such as the floor.

In the configuration illustrated in FIG. 2, each of the plurality of light output control devices a to n, 100*a* to *n* shares information on an occlusion region (shadow region) which no output light from the light output control device reaches via the communication network.

Each of the plurality of light output control devices a to n, 100*a* to *n* controls the application region of light output from each light output control device on the basis of the shared information. Specifically, output light control is executed to eliminate or reduce the occlusion region (shadow region).

Moreover, in a case where the autonomous traveling robot 30 is a robot that outputs robot applying light by itself, the light output control devices a to n, 100*a* to *n* analyze light (robot applying light) output from the robot, and control the output light so as not to disturb the robot applying light.

Specific examples of an output light control process executed by the light output control devices a to n, 100*a* to *n* of the present disclosure will be described with reference to FIG. 3.

Figure 3:
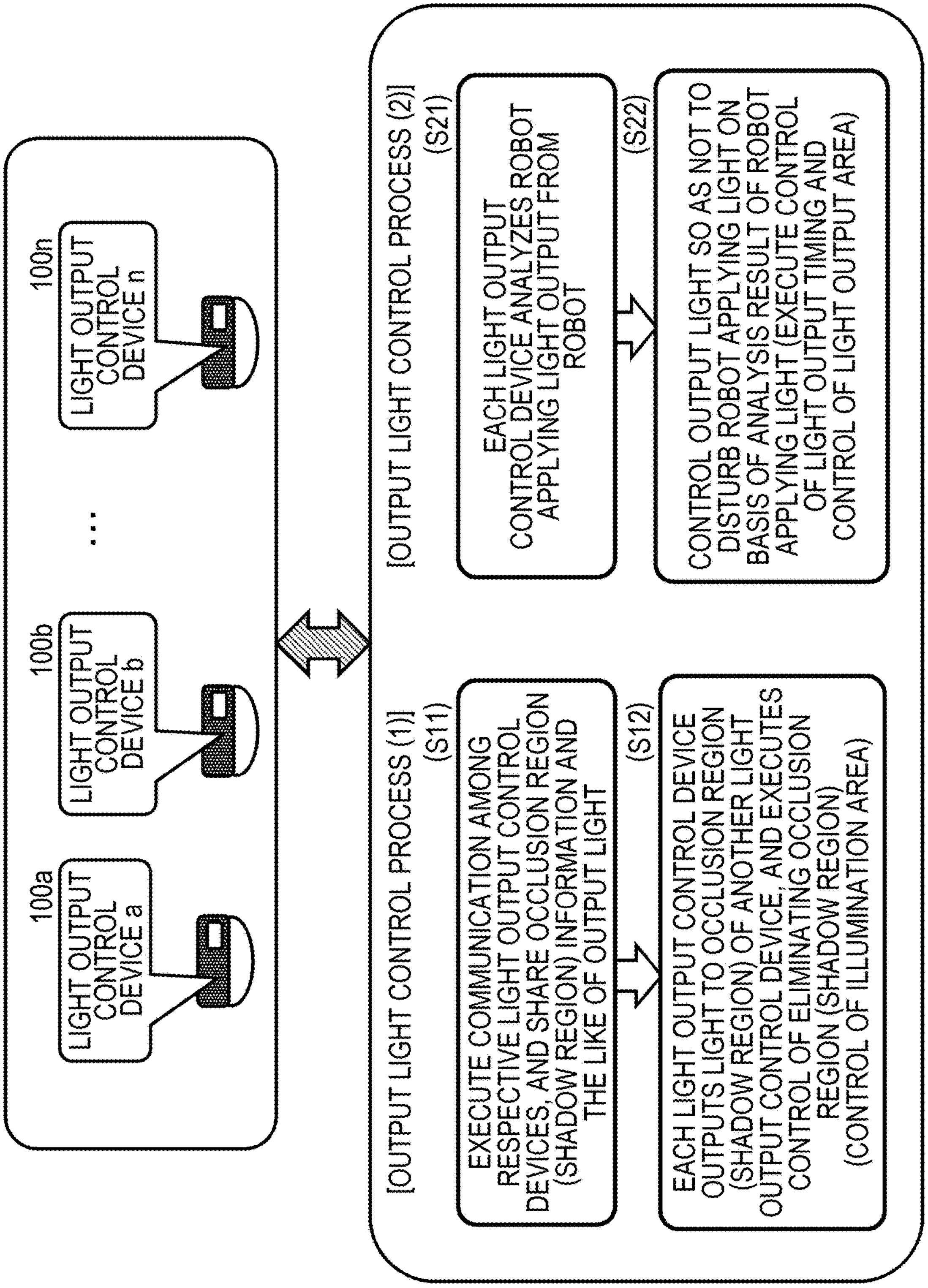
FIG. 3 is a diagram for explaining specific examples of an output light control process executed by the light output control device of the present disclosure.

FIG. 3 is a diagram illustrating two types of main output light control processes (1) and (2) executed by the light output control devices a to n, 100*a* to *n* of the present disclosure.

FIG. 3 illustrates flows illustrating respective process sequences of the output light control processes (1) and (2). These flows will be sequentially described.

Note that the two output light control processes (1) and (2) illustrated in FIG. 3 are processes that can be executed in parallel by each of the light output control devices, a to n, 100*a* to *n* of the present disclosure.

First, the process flow of the output light control process (1) will be described.

(Step S11)

In step S11, the light output control devices a to n, 100*a* to *n* execute communication among the respective light output control devices, and share occlusion region (shadow region) information and the like of each of the light output control devices.

Each of the light output control devices a to n, 100*a* to *n* of the present disclosure includes a camera, analyzes an occlusion region (shadow region) in which output light from each light output control device is blocked by analyzing an image captured by the camera, and provides information regarding the analyzed occlusion region (shadow region) to the other light output control devices.

Note that the occlusion region (shadow region) sequentially changes due to movement of the robot, a process of changing the light output direction of each of the light output control devices a to n, 100*a* to *n*, and the like. Each of the light output control devices a to n, 100*a* to *n* continuously executes the process of analyzing and sharing the changing occlusion region (shadow region).

That is, each of the light output control devices a to n, 100*a* to *n* always shares the latest real-time occlusion region (shadow region) information.

(Step S12)

Next, each of the light output control devices a to n, 100*a* to *n* of the present disclosure applies light to the occlusion region (shadow region) corresponding to output light from another light output control device, and controls the output light so as to eliminate or reduce the occlusion region (shadow region).

That is, each of the light output control devices a to n, 100*a* to *n* of the present disclosure executes control of the light output area so as to eliminate or reduce the occlusion region (shadow region).

As described above, the light output control devices a to n, 100*a* to *n* of the present disclosure detect and share an occlusion region (shadow region), and execute the process of controlling the light application region to eliminate or reduce the occlusion region (shadow region) on the basis of the shared information.

Next, the process flow of the output light control process (2), which is the other output light control process executed by the light output control devices a to n, 100*a* to *n* of the present disclosure, will be described.

(Step S21)

In step S21, each of the light output control devices a to n, 100*a* to *n* of the present disclosure analyzes robot applying light output from the robot.

Specifically, analysis of an application region of robot applying light output from the robot, whether the robot applying light is light (for example, visible light, infrared rays, ultraviolet rays, or the like) having no texture pattern or a texture pattern light having a texture pattern, whether the robot applying light is continuous output light or blinking output light, output timing in the case of blinking output light, and the like is executed.

(Step S22)

Next, in step S22, each of the light output control devices a to n, 100*a* to *n* of the present disclosure controls the output light so as not to disturb the robot applying light on the basis of the analysis result of the robot applying light in step S21.

Specifically, each of the light output control devices a to n, 100*a* to *n* executes control of the light output timing and executes control of the light output area to control the output light so as not to disturb the robot applying light.

As described above, each of the light output control devices a to n, 100*a* to *n* of the present disclosure analyzes robot applying light output by the robot itself, and executes control of the output light so as not to disturb the robot applying light, that is, control of the light output timing and control of the light output area on the basis of the analysis result, and thus controls the output light so as not to disturb the robot applying light.

As described above, the light output control devices a to n, 100*a* to *n* of the present disclosure execute the output light control processes according to the two flows illustrated in FIG. 3.

Note that each of the light output control devices a to n, 100*a* to *n* of the present disclosure selectively outputs normal light (for example, visible light, infrared rays, ultraviolet rays, or the like) having no texture pattern, or light with various designs, so-called texture pattern light.

Figure 4:
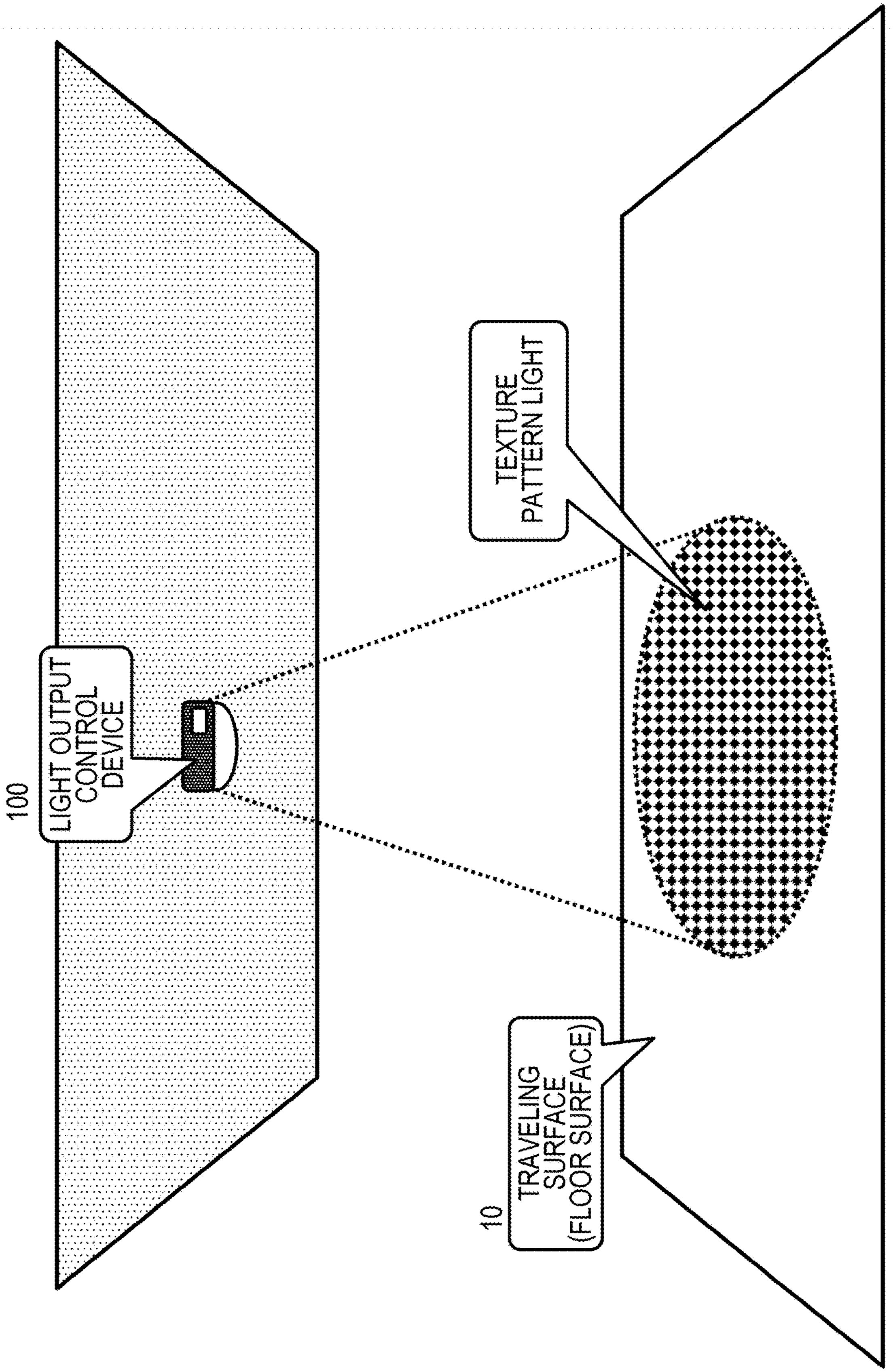
FIG. 4 is a view for explaining an example of texture pattern light including a texture (design) output from the light output control device of the present disclosure.

The light output control devices a to n, 100*a* to *n* of the present disclosure can output light including a texture (design) as illustrated in FIG. 4, in addition to normal light (for example, visible light, infrared rays, ultraviolet rays, or the like) having no texture pattern.

For example, on a wall having a little texture such as a white wall or the like, it is difficult to detect a feature point from an image captured by a stereo camera, and it is difficult to calculate a distance by parallax analysis. In order to solve such a problem, texture pattern light including a texture (design) is applied.

If a texture is included in an image captured by the stereo camera, a feature point is more easily detected, a feature point matching process is more easily performed, and distance calculation by parallax analysis can be performed with high accuracy.

Note that, in a case where various designs exist in an object itself, it is possible to detect many feature points from an image captured by applying normal light (for example, visible light, infrared rays, ultraviolet rays, or the like) having no texture pattern, and it is possible to perform the feature point matching process and distance calculation by parallax analysis with high accuracy.

For such a reason, the light output control devices a to n, 100*a* to *n* of the present disclosure output normal light (for example, visible light, infrared rays, ultraviolet rays, or the like) having no texture pattern in a case where various designs exist in an object itself, and output texture pattern light including a texture (design) including a design as illustrated in FIG. 4 in a case where various designs do not exist in the object itself.

Similarly, texture pattern light with various designs is used as light output from the autonomous traveling robot 30, that is, robot applying light in some cases.

Figure 5:
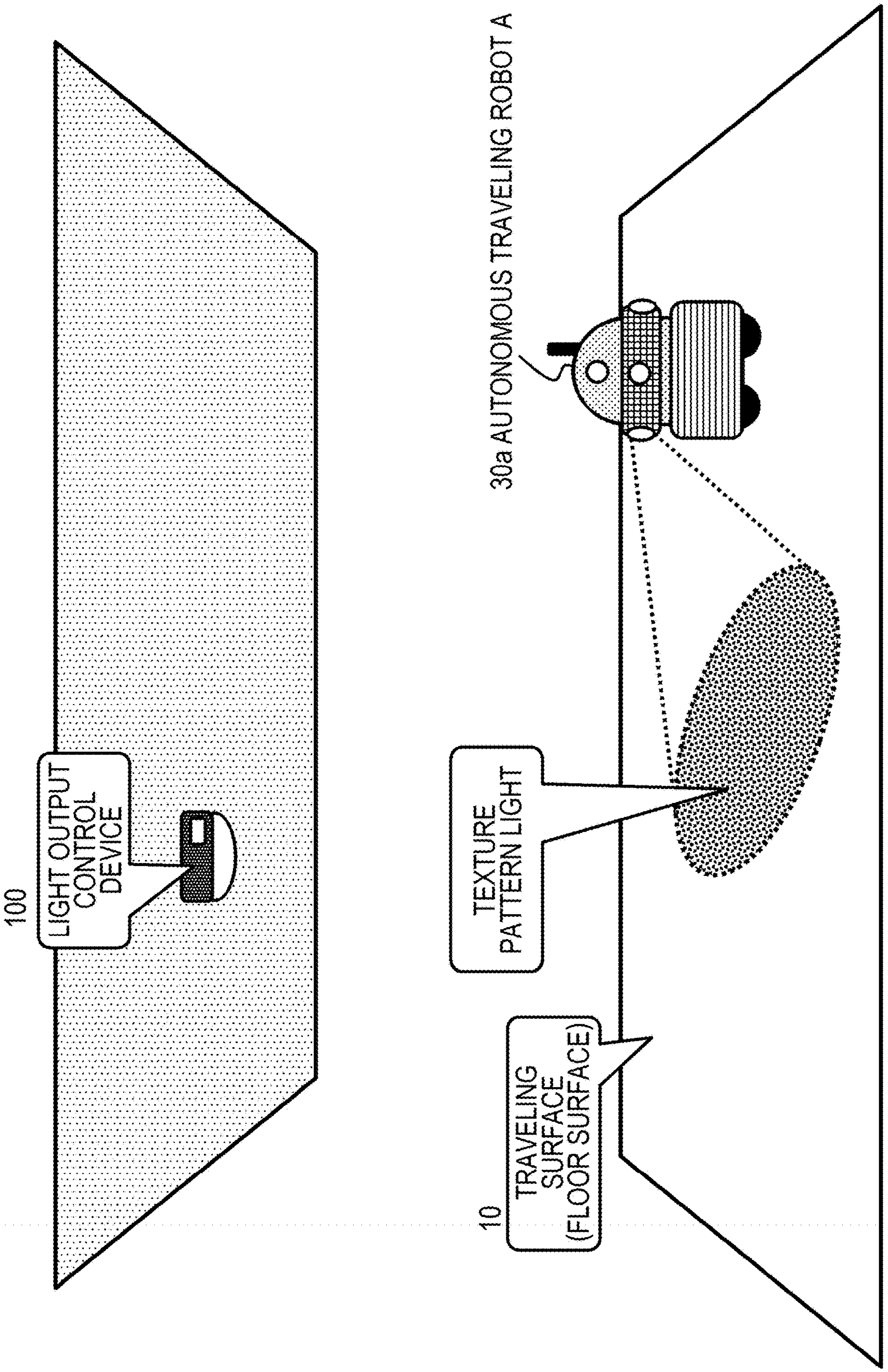
FIG. 5 is a view for explaining an example of texture pattern light output from an autonomous traveling robot.

For example, as illustrated in FIG. 5, the autonomous traveling robot A, 30*a* outputs texture light with a design, and performs depth calculation according to a stereo camera scheme by using a captured image of an object such as a floor to which the texture light is applied, and performs a process of calculating the object distance and the object shape.

Note that the autonomous traveling robot 30 may also be configured to perform an output light switching process of applying normal light (for example, visible light, infrared rays, ultraviolet rays, or the like) having no texture pattern in a case where various designs exist in an object itself, and outputting texture pattern light including texture (design) including the design as illustrated in FIG. 5 in a case where various patterns do not exist in the object itself.

Moreover, the light output control devices a to n, 100*a* to *n* of the present disclosure have a configuration capable of freely controlling the direction and region of applied light.

Figure 6:
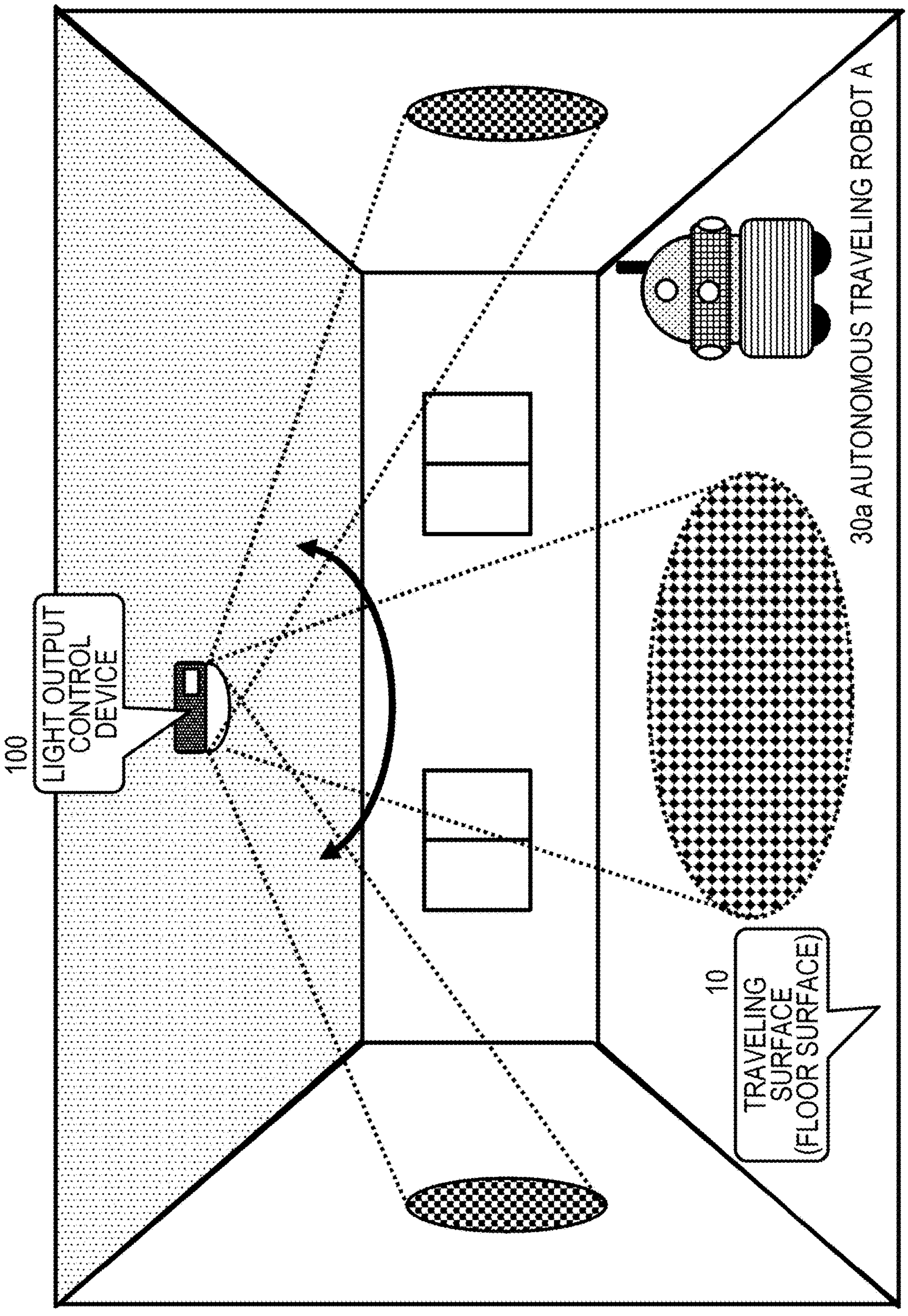
FIG. 6 is a view for explaining examples of texture pattern light output from the light output control device of the present disclosure.

A specific example is illustrated in FIG. 6.

As illustrated in FIG. 6, each of the light output control devices a to n, 100*a* to *n* of the present disclosure includes a light application region control unit therein, and can freely control an application region of output light, that is, a light output direction, a light application range, and the like.

3. Specific Examples of Configuration of and Processing by Light Output Control Device of Present Disclosure Next, specific examples of the configuration of and processing by the light output control device of the present disclosure will be described.

First, a configuration example of each of the light output control devices a to n, 100*a* to *n* of the present disclosure will be described.

Figure 7:
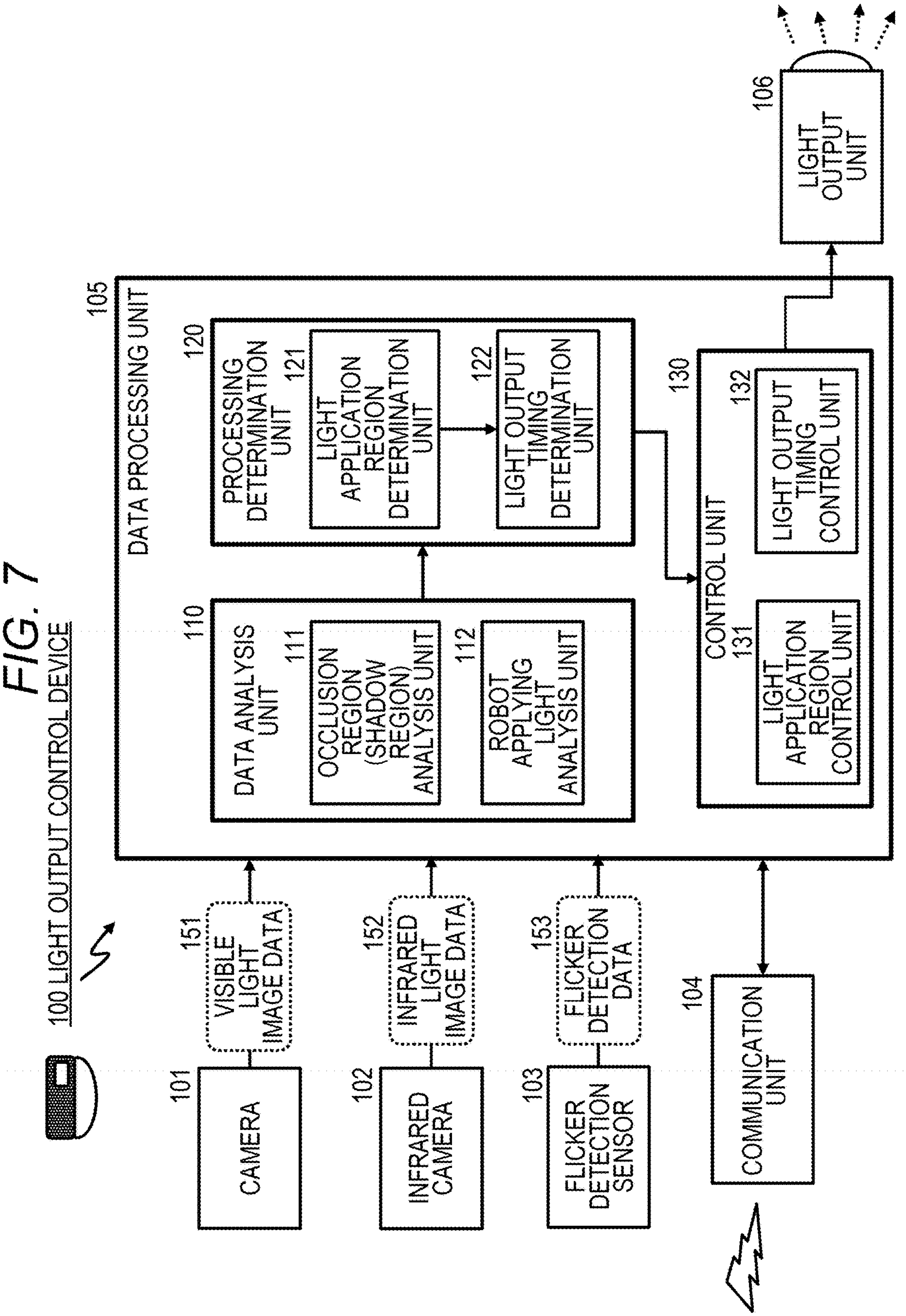
FIG. 7 is a diagram for explaining a configuration example of the light output control device of the present disclosure.

FIG. 7 is a block diagram illustrating a configuration example of each of the light output control devices a to n, 100*a* to *n* of the present disclosure.

As illustrated in FIG. 7, the light output control device 100 includes a camera 101, an infrared camera 102, and a flicker detection sensor 103 which are each an external environment information acquisition sensor, and further includes a communication unit 104, a data processing unit 105, and a light output unit 106.

The data processing unit 105 includes a data analysis unit 110, a processing determination unit 120, and a control unit 130.

Moreover, the data analysis unit 110 includes an occlusion region (shadow region) analysis unit 111 and a robot applying light analysis unit 112.

The processing determination unit 120 includes a light application region determination unit 121 and a light output timing determination unit 122.

The control unit 130 includes a light application region control unit 131 and a light output timing control unit 132.

The camera 101, which is an external environment information acquisition sensor, captures a visible light image, and inputs captured visible light image data 151 to the data processing unit 105.

Moreover, the infrared camera 102, which is an external environment information acquisition sensor, captures an infrared light image, and inputs captured infrared light image data 152 to the data processing unit 105.

The flicker detection sensor 103, which is another external environment information acquisition sensor, detects the presence or absence of a flicker in a light output enable space of the light output control device 100, that is, the presence or absence of blinking light, and inputs flicker detection data 153 to the data processing unit 105.

The flicker detection data 153 is data including information on the presence or absence of a flicker and, in a case where there is a flicker (blinking light), information enabling analysis of the light emission time and the light emission cycle of the flicker.

The communication unit 104 executes communication with the other light output control devices connected via the communication network.

Data output from the communication unit 104 to the other external light output control devices is, for example, visible light image data 151 that the data processing unit 105 has received from the camera 101, infrared light image data 152 that the data processing unit 105 has received from the infrared camera 102, data analyzed by the data analysis unit 110 of the data processing unit 105, and the like.

The data analyzed by the data analysis unit 110 of the data processing unit 105 includes, for example, occlusion region (shadow region) information, analysis data of robot applying light, and the like analyzed on the basis of a camera-captured image.

The other external light output control devices also transmit visible light image data 151 captured by the cameras provided in the respective light output control devices, infrared light image data 152, and analysis data, and the communication unit 104 illustrated in FIG. 7 receives transmission data of the other light output control devices and inputs the transmission data to the data processing unit 105.

The data analysis unit 110 of the data processing unit 105 performs data analysis by using image data and analysis data from the other light output control devices received via the communication unit 104 in addition to the visible light image data 151 and the infrared light image data 152 captured by the cameras of the light output control device 100.

The data analysis unit 110 includes the occlusion region (shadow region) analysis unit 111 and the robot applying light analysis unit 112.

The occlusion region (shadow region) analysis unit 111 uses the visible light image data 151 and the infrared light image data 152 captured by the cameras of the light output control device 100, and image data and analysis data generated by the other light output control devices received via the communication unit 104 to analyze in which region an occlusion region (shadow region) has occurred.

The robot applying light analysis unit 112 uses the visible light image data 151 and the infrared light image data 152 captured by the cameras of the light output control device 100, and image data and analysis data generated by the other light output control devices received via the communication unit 104 to analyze what kind of robot applying light the robot traveling in a light output enable area outputs.

Specifically, for example, analysis is performed on whether applied light output from the robot is normal light (for example, visible light, infrared rays, ultraviolet rays, or the like) having no texture pattern or texture pattern light, and moreover whether the applied light output from the robot is continuous output light or pulse light having a blinking output pattern in which output ON/OFF is repeated.

Detection information of the flicker detection sensor 103 can be used for a process of judging whether applied light output from the robot is continuous output light or pulse light having a blinking output pattern in which output ON/OFF is repeated.

From the flicker detection sensor 103, flicker detection data 153 including information on the presence or absence of a flicker (blinking light) and, in a case where there is a flicker, information enabling analysis of the light emission time and the light emission cycle of the flicker is input.

The robot applying light analysis unit 112 can execute a process of judging whether applied light output from the robot is continuous output light or pulse light having a blinking output pattern in which output ON/OFF is repeated by using this data.

An analysis result of the data analysis unit 110, that is, occlusion region (shadow region) information analyzed by the occlusion region (shadow region) analysis unit 111 and robot applying light analysis information analyzed by the robot applying light analysis unit 112 are input to the processing determination unit 120.

The processing determination unit 120 includes a light application region determination unit 121 and a light output timing determination unit 122.

On the basis of the occlusion region (shadow region) information analyzed by the occlusion region (shadow region) analysis unit 111, the light application region determination unit 121 determines an optimum light application region for eliminating or maximally reducing the occlusion region (shadow region).

Moreover, an optimum light application region that does not disturb the robot applying light is determined on the basis of the robot applying light analysis information analyzed by the robot applying light analysis unit 112.

The light output timing determination unit 122 determines an optimum light output timing that does not disturb the robot applying light on the basis of the robot applying light analysis information analyzed by the robot applying light analysis unit 112.

Note that a configuration may be adopted in which the output timing determination process is always executed, but a configuration may also be adopted in which the output timing determination process is executed only in a case where the light application region determined by the light application region determination unit 121 includes a region overlapping the robot applying light.

The process executed by the light output timing determination unit 122 in a case where the configuration is adopted in which the output timing determination process is executed only in a case where the light application region determined by the light application region determination unit 121 includes a region overlapping the robot applying light as described above is as follows.

The light output timing determination unit 122 receives light application region information from the light application region determination unit 121, judges whether or not a region overlapping the robot applying light is included in the light application region, and executes a process of determining the light output timing only in a case where the overlapping region is included.

Determination information determined by the light application region determination unit 121 and the light output timing determination unit 122 of the processing determination unit 120, that is, light application region information determined by the light application region determination unit 121 and the light output timing information determined by the light output timing determination unit 122 are input to the control unit 130.

The control unit 130 includes a light application region control unit 131 and a light output timing control unit 132.

The light application region control unit 131 of the control unit 130 drives and controls the light output unit 106 such that applied light from the light output control device is output to the light application region determined according to the light application region information determined by the light application region determination unit 121 of the processing determination unit 120.

Moreover, the light output timing control unit 132 of the control unit 130 controls the light emission timing of the light output unit 106 so that applied light from the light output control device is output according to the light output timing determined according to the light output timing information determined by the light output timing determination unit 122 of the processing determination unit 120.

As described above, each of the light output control devices a to n, 100*a* to *n* of the present disclosure has the configuration illustrated in FIG. 7, and controls the light application region and the light output timing with this configuration. Specifically, control is performed to output applied light from the light output control device to an optimum light application region that eliminates or maximally reduces the occlusion region (shadow region) and does not disturb robot applying light. Moreover, applied light from the light output control device is output at an optimum light output timing that does not disturb the robot applying light.

Specific examples of the light output process executed by each of the light output control devices a to n, 100*a* to *n* of the present disclosure will be described with reference to FIG. 8 and subsequent drawings.

First, with reference to FIGS. 8 to 10, an example of the process of controlling output of applied light from the light output control device by determining the light application region so as to eliminate or maximally reduce the occlusion region (shadow region) will be described.

Figure 8:
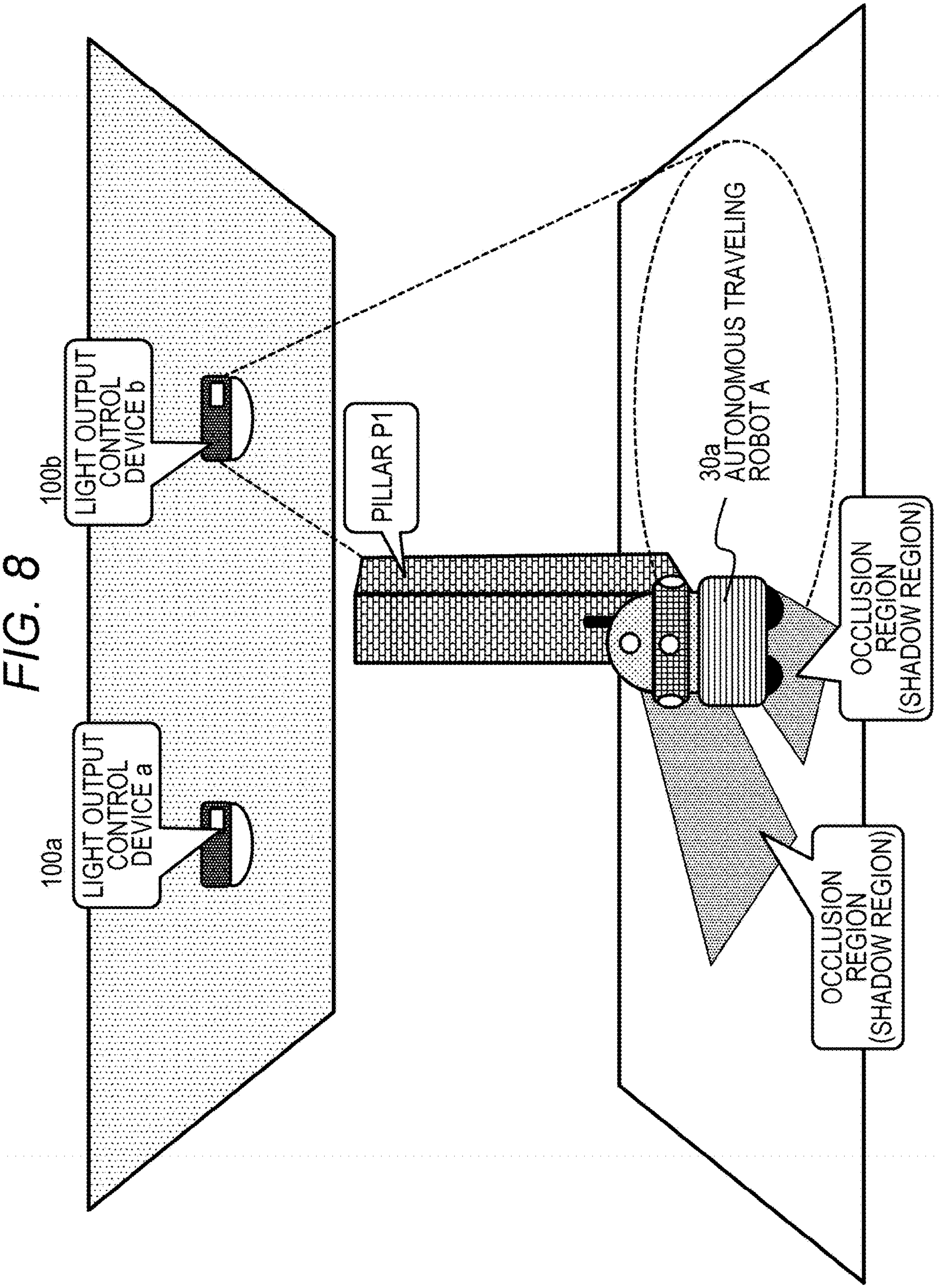
FIG. 8 is a view for explaining a specific example of the light output process executed by the light output control device of the present disclosure.

FIG. 8 illustrates two light output control devices, that is, the light output control device a, 100*a* and the light output control device b, 100*b*. Only the light output control device b, 100*b* is outputting applied light.

In this state, the light output control device a, 100*a* determines the light application region so as to eliminate or maximally reduce the occlusion region (shadow region), and performs control of outputting applied light from the light output control device a, 100*a* to the determined region.

The occlusion region (shadow region) analysis unit 111 of the data analysis unit 110 of the light output control device a, 100*a* uses visible light image data 151 and infrared light image data 152 captured by the cameras of the light output control device a, 100*a*, and image data and analysis data generated by the other light output control devices received via the communication unit 104 to analyze in which region an occlusion region (shadow region) has occurred.

In the example illustrated in FIG. 8, the occlusion region (shadow region) analysis unit 111 of the light output control device a, 100*a* detects the following occlusion regions:

(a) an occlusion region (shadow region) by the pillar P1; and (b) an occlusion region (shadow region) generated by the autonomous traveling robot A, 30*a*; and specifies positions thereof.

Occlusion region (shadow region) information (=occlusion region position information) analyzed by the occlusion region (shadow region) analysis unit 111 is input to the light application region determination unit 121 of the light output control device a, 100*a*.

On the basis of the occlusion region (shadow region) information analyzed by the occlusion region (shadow region) analysis unit 111, the light application region determination unit 121 of the light output control device a, 100*a* determines an optimum light application region for eliminating or maximally reducing the occlusion region (shadow region).

Figure 9:
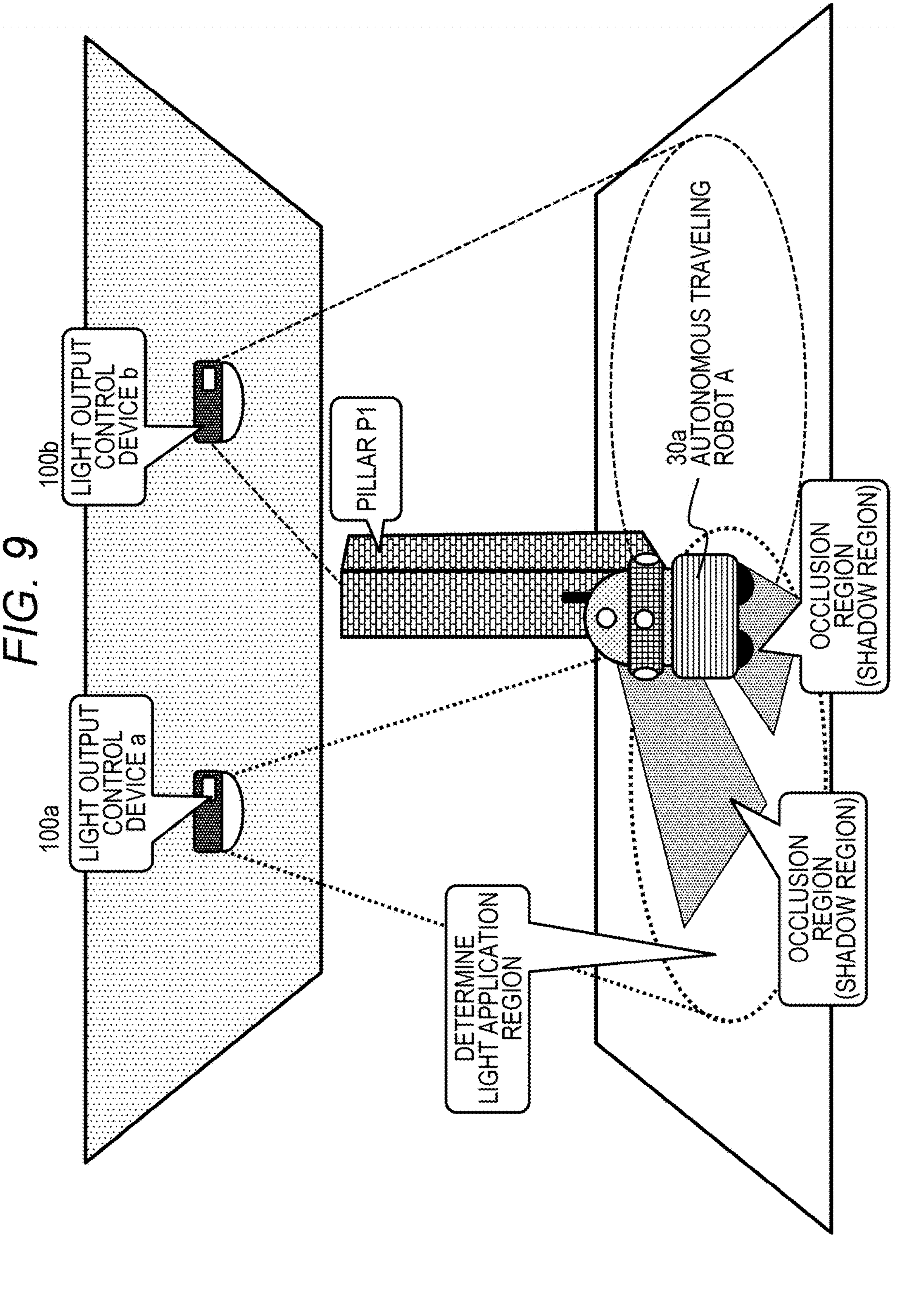
FIG. 9 is a view for explaining a specific example of the light output process executed by the light output control device of the present disclosure.

Specifically, for example, as illustrated in FIG. 9, the optimum light application region is determined in order to eliminate or maximally reduce the occlusion region (shadow region) generated by the pillar P1 and the occlusion region (shadow region) generated by the autonomous traveling robot A, 30*a*.

Light application region information determined by the light application region determination unit 121 of the light output control device a, 100*a* is input to the control unit 130 of the light output control device a, 100*a*.

The light application region control unit 131 of the control unit 130 of the light output control device a, 100*a* drives and controls the light output unit 106 of the light output control device a, 100*a* such that applied light from the light output control device a, 100*a* is output to the light application region determined according to the light application region information determined by the light application region determination unit 121 of the light output control device a, 100*a*.

Figure 10:
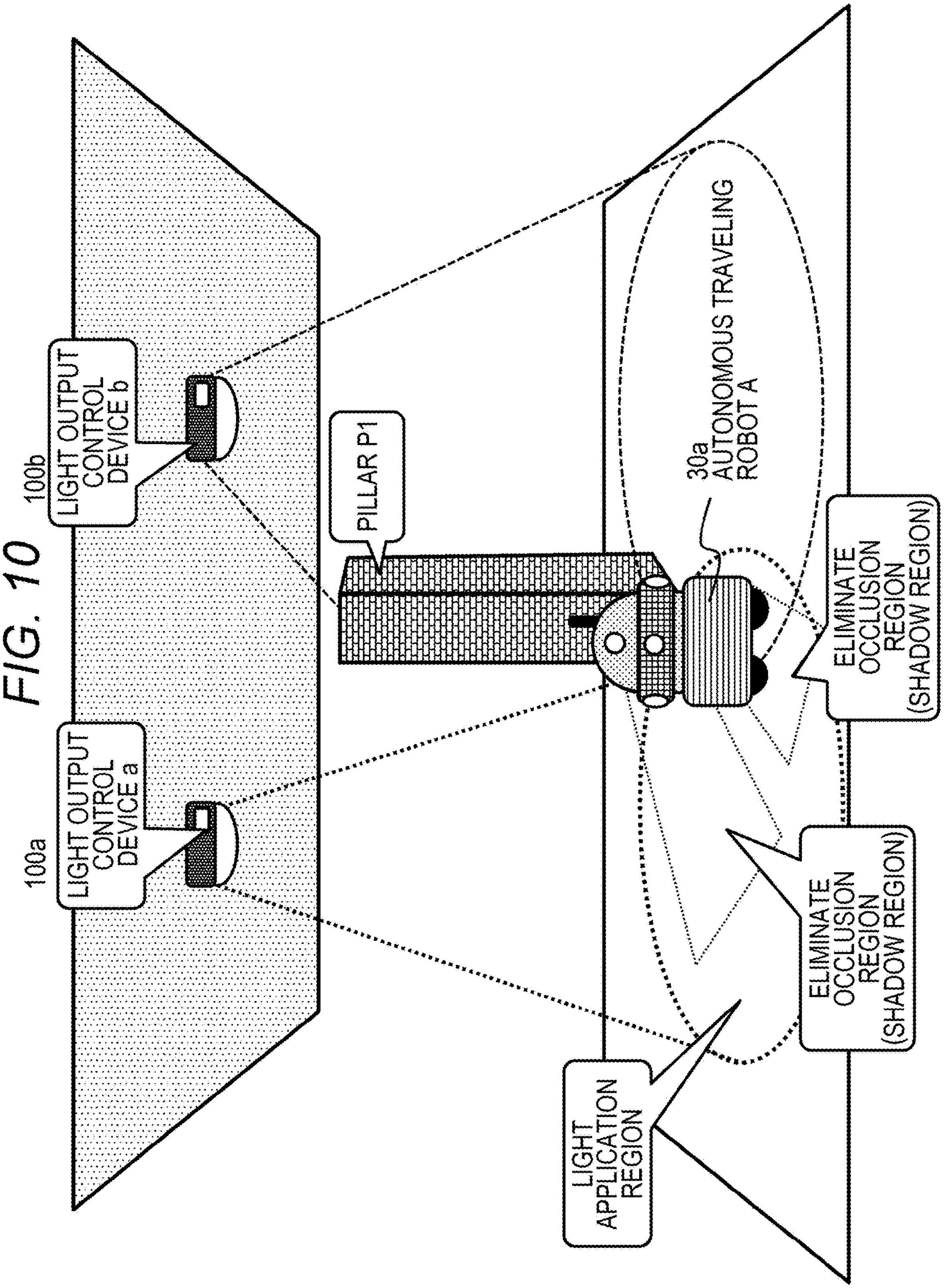
FIG. 10 is a view for explaining a specific example of the light output process executed by the light output control device of the present disclosure.

As a result, as illustrated in FIG. 10, light from the light output control device a, 100*a* is applied to the light application region determined by the light application region determination unit 121, and the occlusion region (shadow region) generated by the pillar P1 and the occlusion region (shadow region) generated by the autonomous traveling robot A, 30*a* are eliminated.

Next, with reference to FIGS. 11 and 12, an example will be described in which an optimum light application region that does not disturb robot applying light is determined and control is performed to output applied light from the light output control device.

Figure 11:
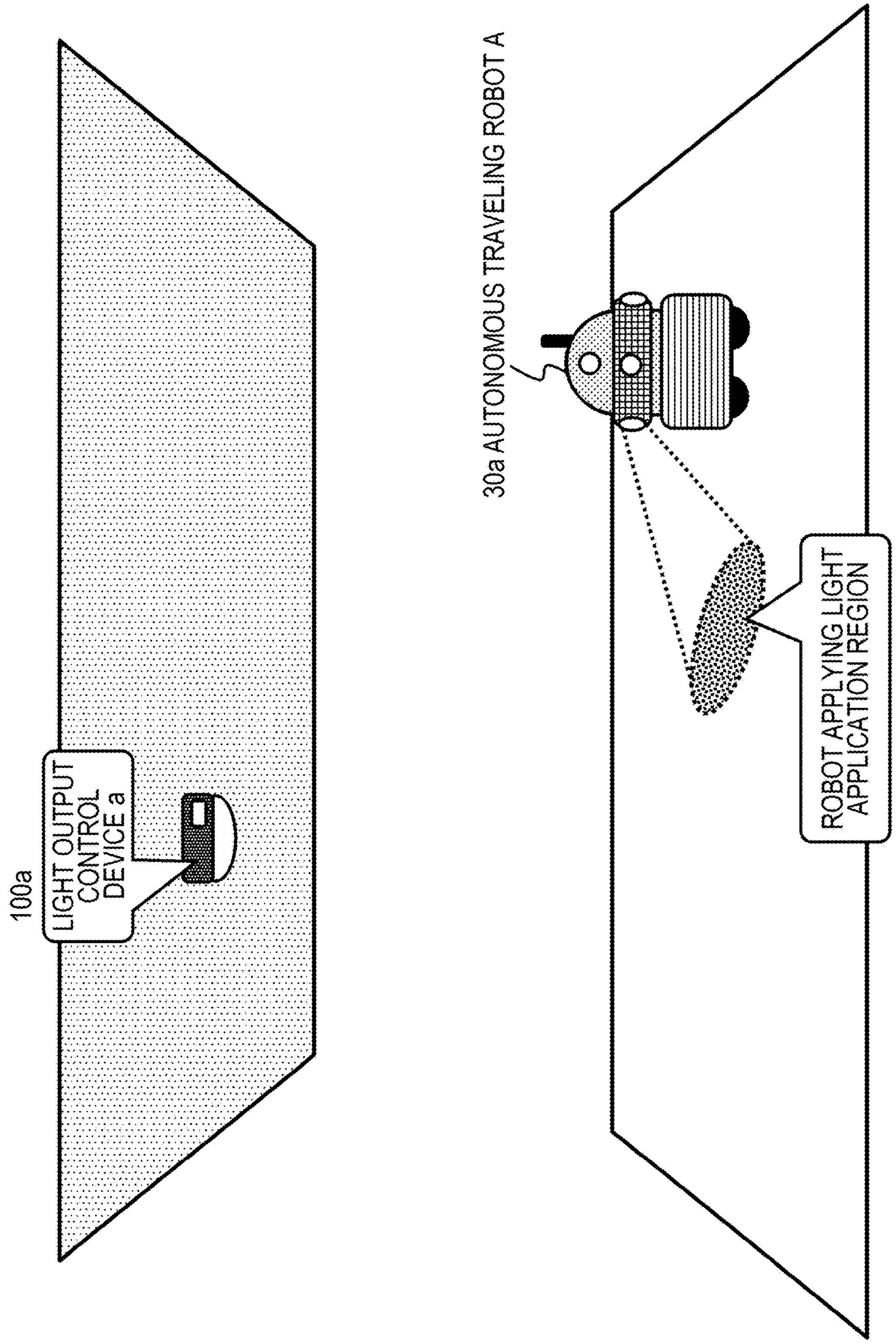
FIG. 11 is a view for explaining a specific example of the light output process executed by the light output control device of the present disclosure.

FIG. 11 illustrates the light output control device a, 100*a* and the autonomous traveling robot A, 30*a* that outputs robot applying light and travels.

In this state, the light output control device a, 100*a* performs control of determining the optimum light application region that does not disturb the robot applying light and outputting applied light from the light output control device.

The robot applying light analysis unit 112 of the data analysis unit 110 of the light output control device a, 100*a* uses visible light image data 151 and infrared light image data 152 captured by the cameras of the light output control device a, 100*a*, and image data and analysis data generated by the other light output control devices received via the communication unit 104 to analyze to which region the robot applying light output from the robot is output.

For example, a robot applying light application region as illustrated in FIG. 11 is detected.

Robot applying light application region information analyzed by the robot applying light analysis unit 112 is input to the light application region determination unit 121 of the light output control device a, 100*a*.

The light application region determination unit 121 of the light output control device a, 100*a* determines an optimum light application region that does not disturb the robot applying light on the basis of the robot applying light application region information analyzed by the robot applying light analysis unit 112.

Figure 12:
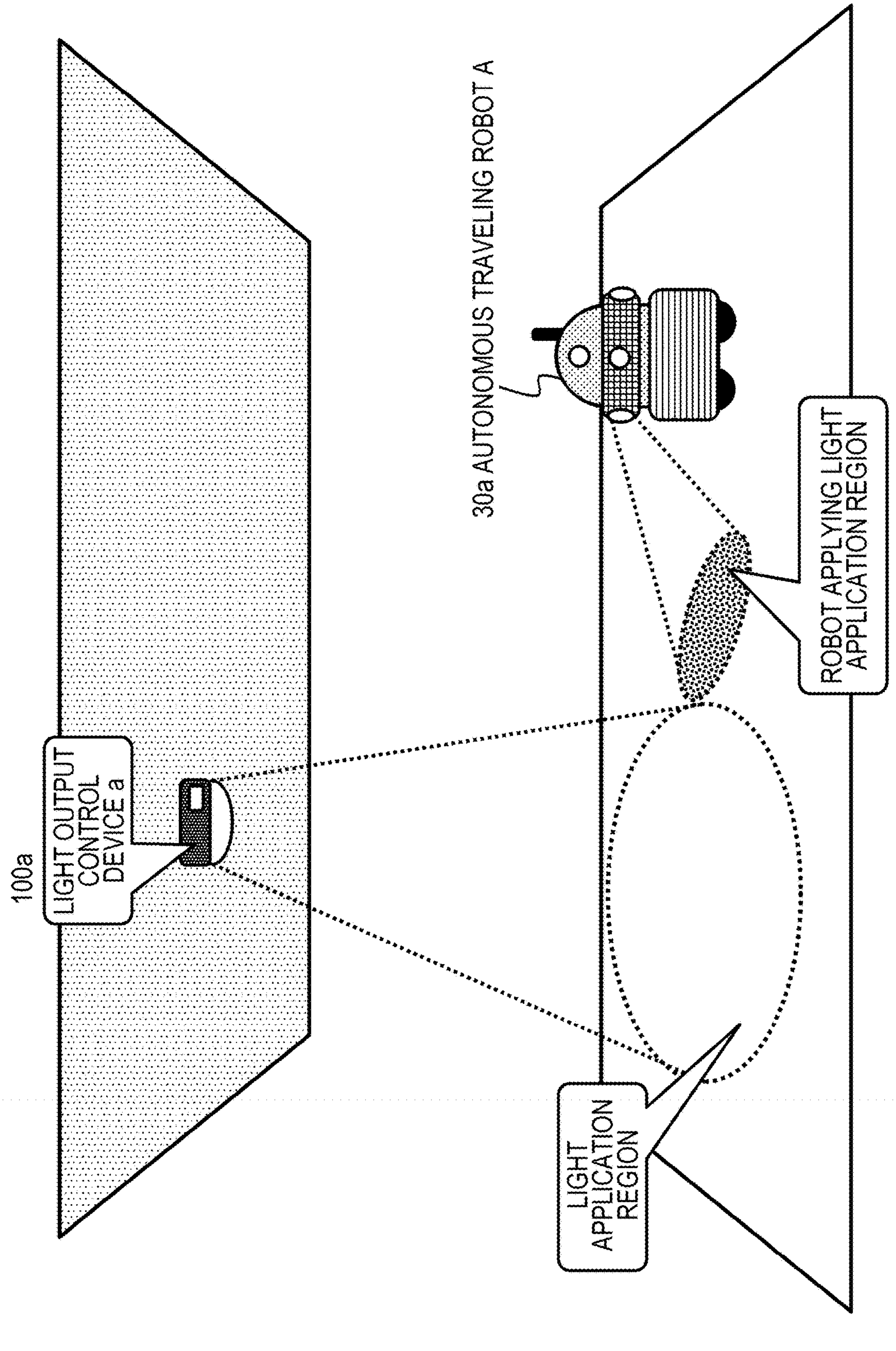
FIG. 12 is a view for explaining a specific example of the light output process executed by the light output control device of the present disclosure.

Specifically, for example, as illustrated in FIG. 12, the optimum light application region that does not disturb the robot applying light is determined.

Light application region information determined by the light application region determination unit 121 of the light output control device a, 100*a* is input to the control unit 130 of the light output control device a, 100*a*.

The light application region control unit 131 of the control unit 130 of the light output control device a, 100*a* drives and controls the light output unit 106 such that applied light from the light output control device is output to the light application region determined according to the light application region information determined by the light application region determination unit 121 of the light output control device a, 100*a*.

Figure 13:
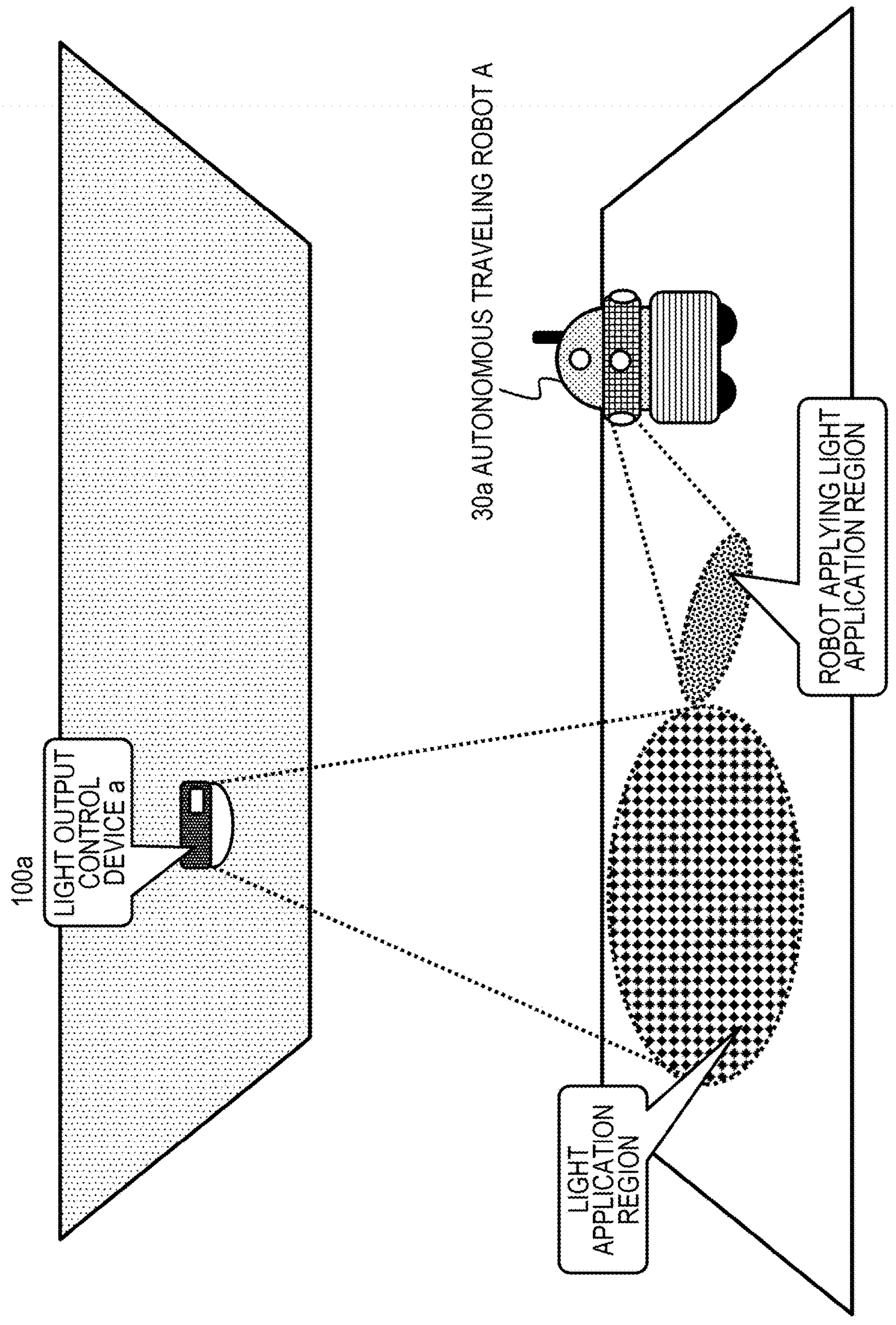
FIG. 13 is a view for explaining a specific example of the light output process executed by the light output control device of the present disclosure.

As a result, as illustrated in FIG. 13, light from the light output control device a, 100*a* is applied to the light application region determined by the light application region determination unit 121, and output light from the light output control device a, 100*a* is applied to a region that does not disturb the robot applying light.

Next, with reference to FIGS. 14 and 16, an example will be described in which an optimum light application timing that does not disturb robot applying light is determined and light output control is performed.

Figure 14:
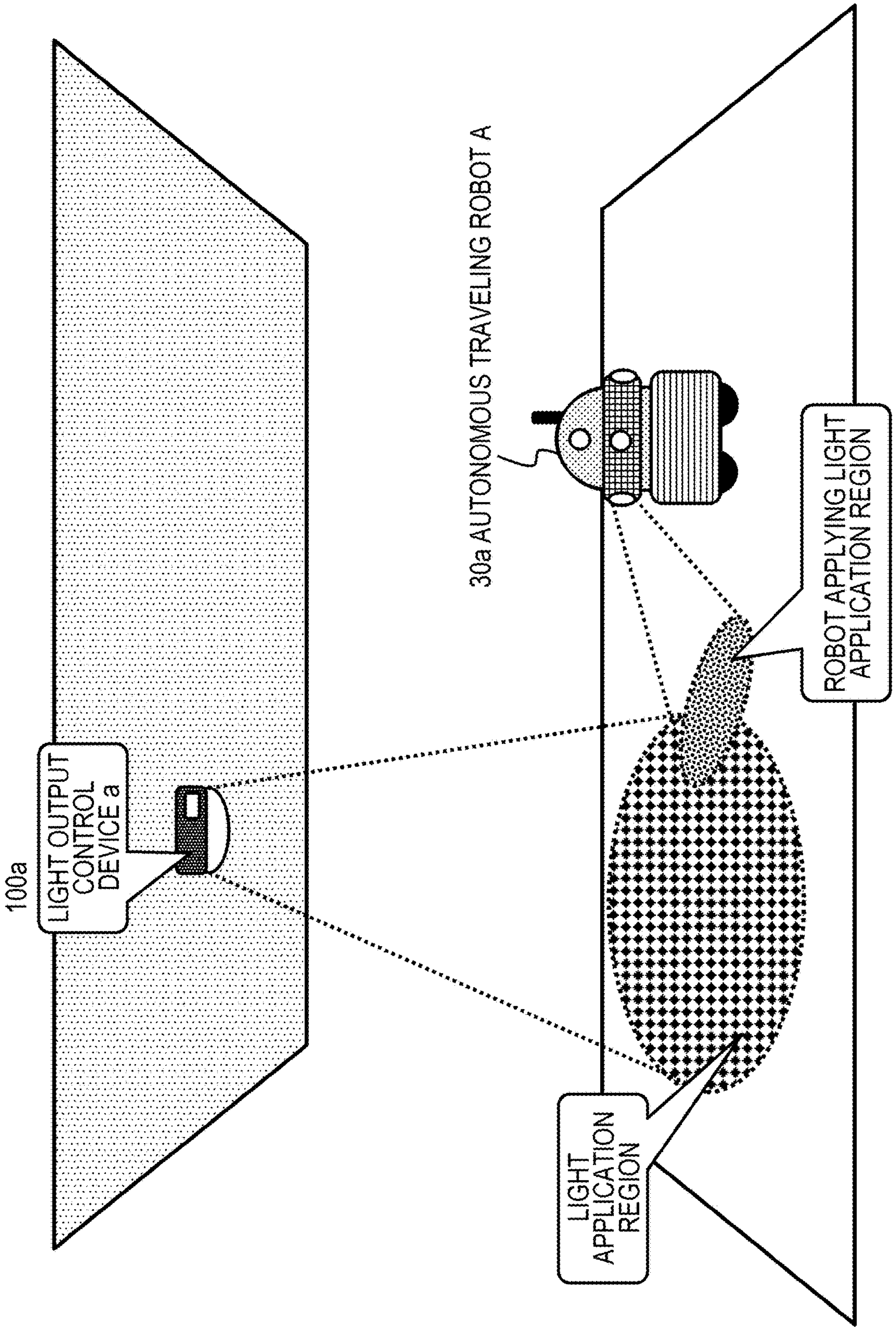
FIG. 14 is a view for explaining a specific example of the light output process executed by the light output control device of the present disclosure.

FIG. 14 illustrates the light output control device a, 100*a* and the autonomous traveling robot A, 30*a* that outputs robot applying light and travels.

In this state, the light output control device a, 100*a* performs control to determine the optimum light application timing that does not disturb the robot applying light and outputs applied light from the light output control device.

The robot applying light analysis unit 112 of the data analysis unit 110 of the light output control device a, 100*a* uses visible light image data 151 and infrared light image data 152 captured by the cameras of the light output control device a, 100*a*, and image data and analysis data generated by the other light output control devices received via the communication unit 104 to analyze the application region of the robot applying light output from the robot and what type of robot applying light is output.

Specifically, for example, analysis is performed on whether applied light output from the robot is light (for example, visible light, infrared rays, ultraviolet rays, or the like) having no texture pattern or texture pattern light, and moreover whether the applied light output from the robot is continuous output light or pulse light having a blinking output pattern in which output ON/OFF is repeated.

For example, in a case where applied light output from the robot is pulse light having a blinking output pattern in which output ON/OFF is repeated, the output pattern thereof is analyzed.

Figure 15:
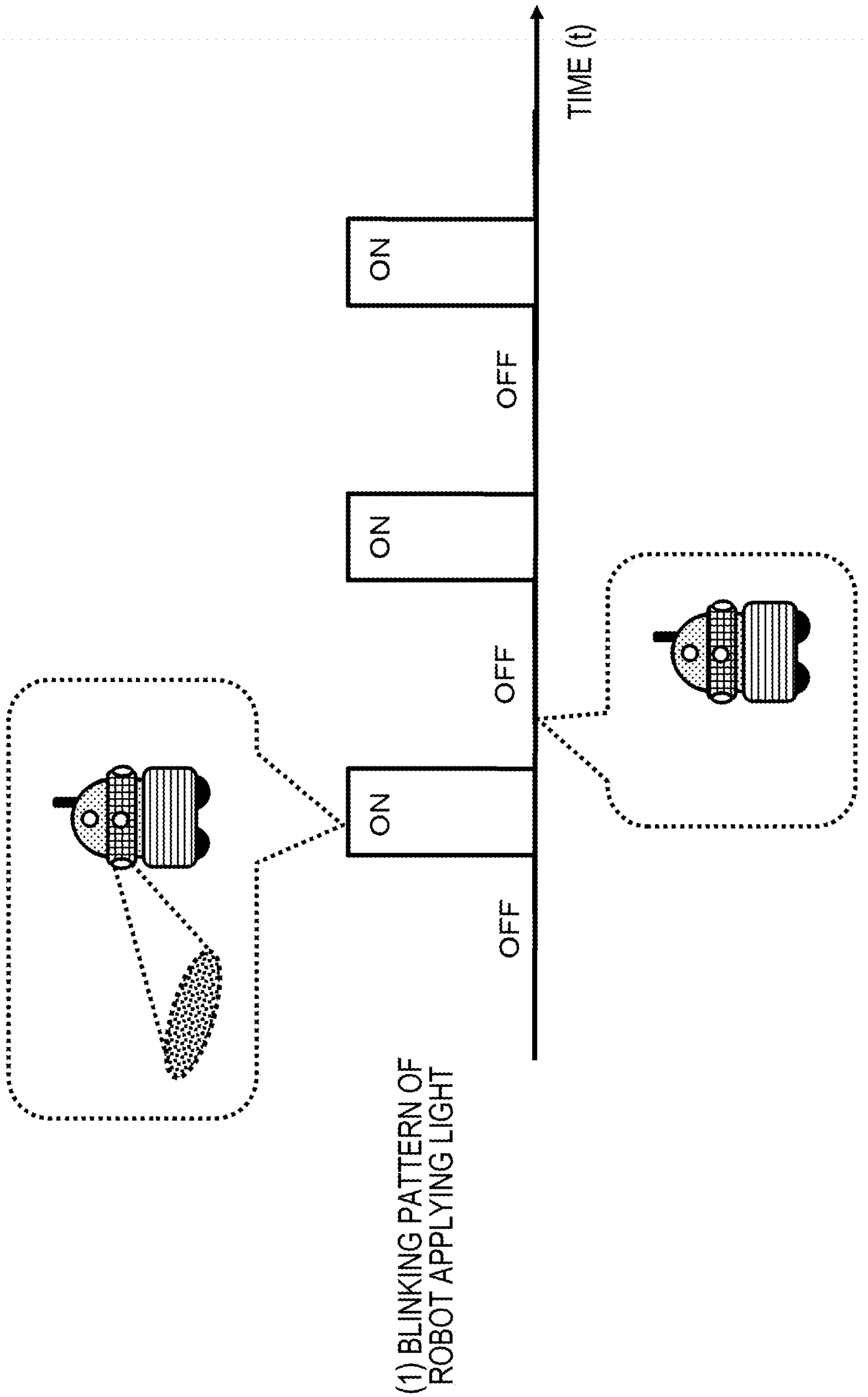
FIG. 15 is a diagram for explaining an example of an analysis result of a blinking pattern of robot applying light.

Specifically, for example, as illustrated in FIG. 15, the blinking pattern of the robot applying light is analyzed. That is, analysis of output timing information such as ON/OFF timing of light output of the robot applying light, and the like are executed.

The output timing information of the robot applying light analyzed by the robot applying light analysis unit 112 is input to the light output timing determination unit 122 of the light output control device a, 100*a*.

The light output timing determination unit 122 of the light output control device a, 100*a* determines the optimum light output timing that does not disturb the robot applying light on the basis of the robot applying light analysis information analyzed by the robot applying light analysis unit 112.

Figure 16:
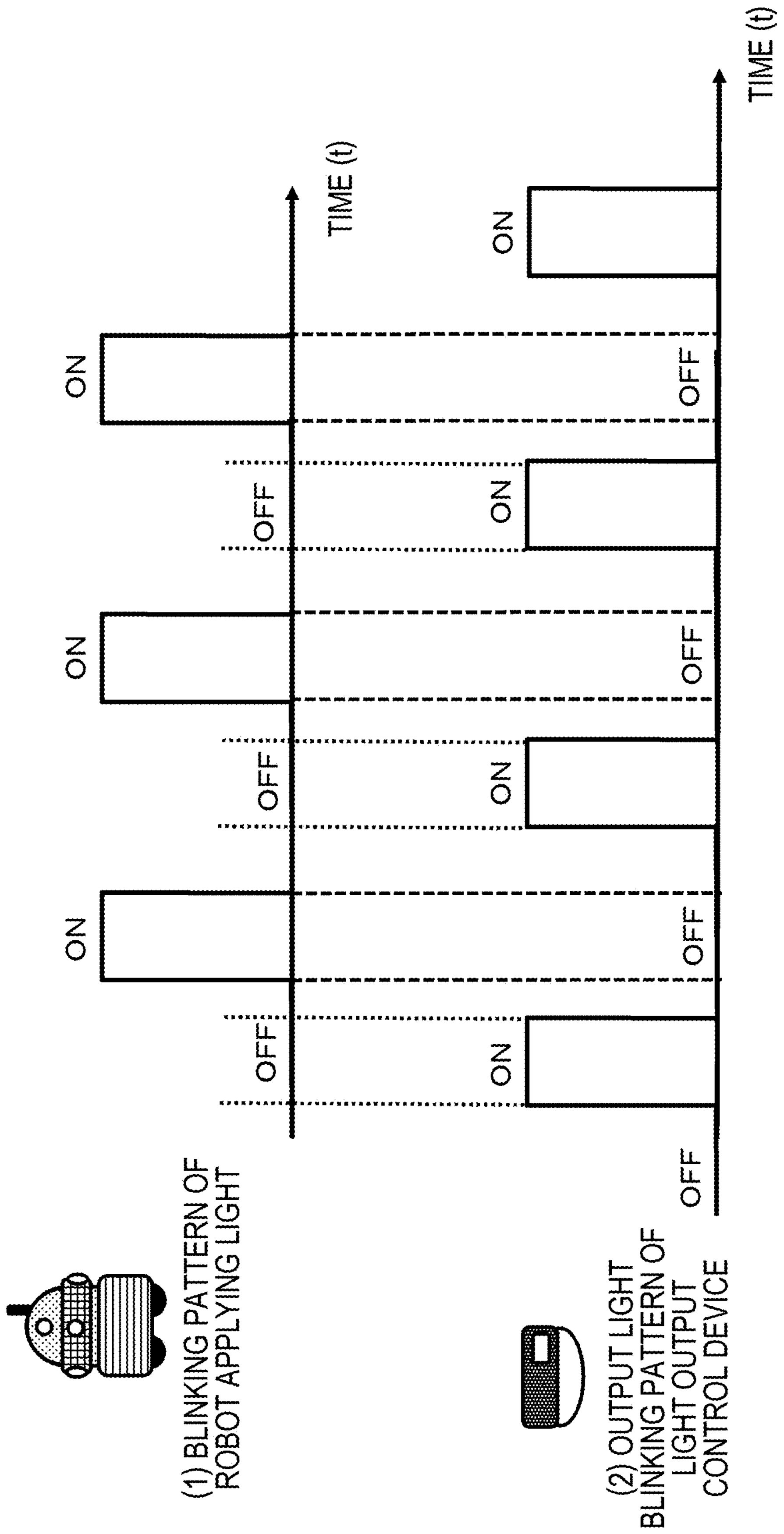
FIG. 16 is a diagram for explaining an example of the blinking pattern of the robot applying light and an output light blinking pattern of the light output control device.

Specifically, for example, the light output timing is determined so as to have the setting of the blinking pattern as illustrated in FIG. 16 (2).

FIG. 16 illustrates each of the following blinking patterns.

(1) The blinking pattern of the robot applying light (2) The output light blinking pattern of the light output control device The blinking pattern of the robot applying light illustrated in FIG. 16 (1) is the blinking pattern described with reference to FIG. 15, and is the blinking pattern of the robot applying light analyzed by the robot applying light analysis unit 112 of the data analysis unit 110 of the light output control device a, 100*a*.

The light output timing determination unit 122 of the light output control device a, 100*a* determines the optimum light output timing that does not disturb the robot applying light on the basis of the blinking pattern of the robot applying light illustrated in FIG. 16 (1).

Specifically, the output timing is determined such that applied light from the light output control device a, 100*a* is output only in a period in which the robot applying light is not output in the blinking pattern of the robot applying light illustrated in FIG. 16 (1) (OFF period in FIG. 16 (1)).

That is, light output timing is determined so as to have the setting of the blinking pattern as illustrated in FIG. 16 (2).

Light output timing information determined by the light output timing determination unit 122 of the light output control device a, 100*a* is input to the control unit 130 of the light output control device a, 100*a*.

The light output timing control unit 132 of the control unit 130 of the light output control device a, 100*a* drives and controls the light output unit 106 so that applied light from the light output control device is output at the light output timing (ON timing of the blinking pattern of (2) of FIG. 15) determined according to the light output timing information determined by the light output timing determination unit 122 of the output control device a, 100*a*.

As a result, applied light from the light output control device a, 100*a* is applied at an optimum light output timing that does not disturb the robot applying light.

Note that, in a case where applied light from the light output control device a, 100*a* is set to have a setting of the blinking pattern as illustrated in FIG. 16 (2), this light pulse can be used as a master clock signal.

For example, pulse light output from the light output control device a, 100*a* is detected by the other light output control devices and the sensor of the robot, and the detected pulse is used as a reference clock of data processing of each light output control device and the robot. This processing enables various processes performed in each device and the robot to be synchronized.

Specific examples of the light output process executed by each of the light output control devices a to n, 100*a* to *n* of the present disclosure have been described with reference to FIGS. 8 to 16.

These processes are realized by using the configuration of the light output control device 100 described with reference to FIG. 7.

Note that in the configuration of the light output control device 100 illustrated in FIG. 7, the configuration of the data processing unit 105 may be executed in a server connected to the light output control devices a to n, 100_a_ to _n_.

Figure 17:
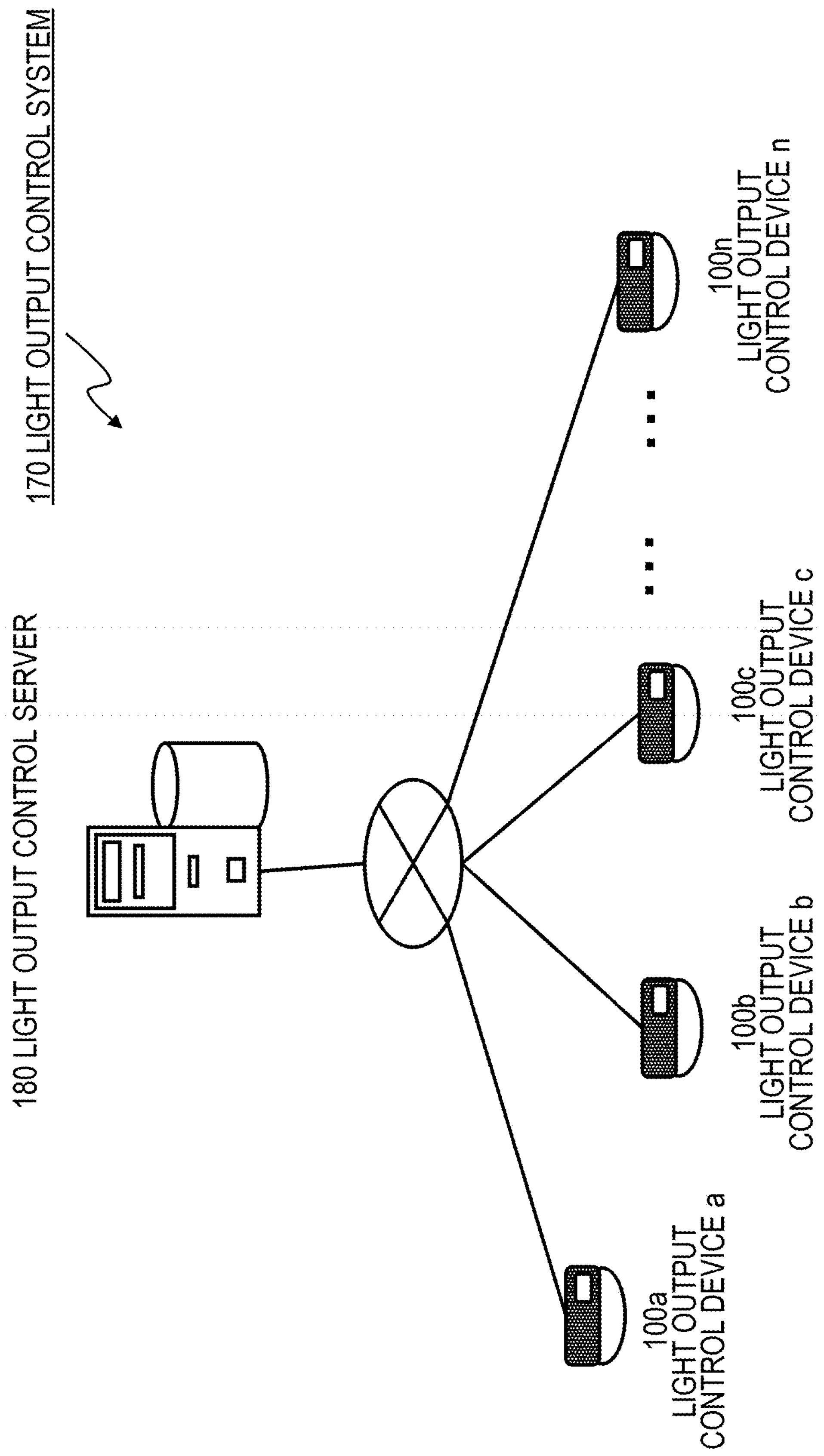
FIG. 17 is a diagram for explaining an example of a light output control system in which a plurality of light output control devices and a light output control server are connected via a communication network.

For example, as illustrated in FIG. 17, a light output control system 170 is configured in which a plurality of light output control devices a to n, 100_a_ to _n_ and a light output control server 180 are connected via a communication network.

Each of the plurality of light output control devices a to n, 100_a_ to _n_ includes a configuration other than the data processing unit 105 in the configuration illustrated in FIG. 7, that is, a camera 101, an infrared camera 102, a communication unit 104, and a light output unit 106.

The light output control server 180 has the configuration of the data processing unit 105 described with reference to FIG. 7, and executes the processing of the data processing unit 105 described above with reference to FIG. 7. That is, the light output control server 180 determines the light application region and the output timing of each of the plurality of light output control devices a to n, 100_a_ to _n_, and executes light output control of each of the light output control devices a to n, 100_a_ to _n_ according to the light application region and output timing that have been determined.

As described above, a configuration may be adopted in which a device such as one server intensively performs light output control of each of the plurality of light output control devices a to n, 100_a_ to _n_.

4. Configuration and Processing of Robot

Next, a configuration and processing of the robot will be described.

Figure 18:
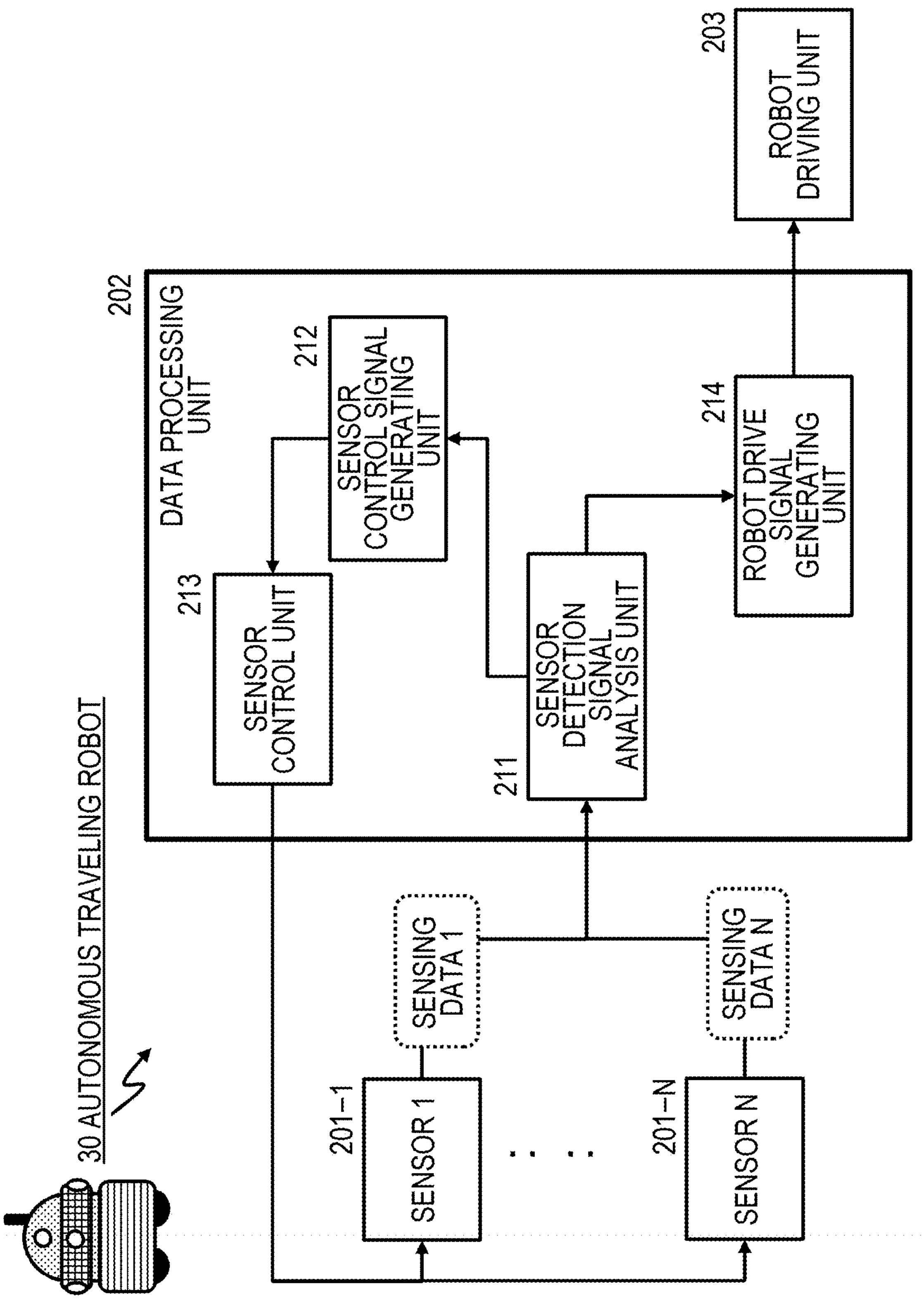
FIG. 18 is a block diagram illustrating a configuration example of an autonomous traveling robot.

FIG. 18 is a block diagram illustrating a configuration example of the autonomous traveling robot illustrated in FIG. 2 and the like.

As illustrated in FIG. 18, the autonomous traveling robot 30 includes a plurality of sensors 1 to N, 201-1 to N, a data processing unit 202, and a robot driving unit 202.

The data processing unit 202 includes a sensor detection signal analysis unit 211, a sensor control signal generating unit 212, a sensor control unit 213, and a robot drive signal generating unit 214.

The plurality of sensors 1 to N, 201-1 to N includes various sensors that acquire sensing information for calculating an object distance and the like.

For example, the plurality of sensors includes the following various sensors.

- (a) A camera and an infrared camera for capturing an image used for object distance calculation by a stereo camera scheme
- (b) A ToF sensor that acquires sensing data according to a time of flight (ToF) scheme of measuring a round-trip time of light from when light is applied to an object until when reflected light from the object is received to calculate the object distance
- (c) A LiDAR sensor that acquires sensing data according to a light detection and ranging (LiDAR) scheme for measuring a round-trip time of laser light reflected by an object to calculate the object distance For example, the plurality of sensors includes these various sensors.

Note that the configuration of the present disclosure does not necessarily include all the configurations (a) to (c) described above. It is sufficient if at least a camera for capturing an image used for object distance calculation by a stereo camera scheme is included.

Sensing data that is sensor detection data of the plurality of sensors 1 to N, 201-1 to N is input to the sensor detection signal analysis unit 211 of the data processing unit 202.

As described above, the data processing unit 202 includes the sensor detection signal analysis unit 211, the sensor control signal generating unit 212, the sensor control unit 213, and the robot drive signal generating unit 214.

The sensor detection signal analysis unit 211 of the data processing unit 202 inputs sensing data that is sensor detection data of the plurality of sensors 1 to N, 201-1 to N, and executes a process of analyzing the sensing data.

Specifically, for example, an object distance calculation process based on the sensing data is executed.

For example, in a case where the object distance is calculated according to the stereo camera scheme, captured images from a plurality of different viewpoints are input as sensing data that is sensor detection data, feature point matching, which is a process of associating feature points included in the plurality of captured images with each other, is performed, and the object distance and the three-dimensional shape are calculated on the basis of a positional shift of images of corresponding feature points in the respective images.

Detection information of the sensor detection signal analysis unit 211 is output to the sensor control signal generating unit 212 and the robot drive signal generating unit 214.

The sensor control signal generating unit 212 analyzes the detection information of the sensor detection signal analysis unit 211, generates a sensor control signal according to the analysis result, and causes the sensor control unit 213 to control the sensor.

For example, in a case where it is judged that sensing data in a direction different from that of the acquired data is required on the basis of the detection information of the sensor detection signal analysis unit 211, the sensor control unit 213 is caused to execute a sensor control process of changing the direction of the sensor.

Furthermore, for example, in a case where it is judged that detailed sensing data is further required on the basis of the detection information of the sensor detection signal analysis unit 211, the sensor control unit 213 is caused to execute output control of the sensor for improving sensor detection accuracy, and the like.

Detection information of the sensor detection signal analysis unit 211 is also output to the robot drive signal generating unit 214.

The detection information of the sensor detection signal analysis unit 211 is, for example, information on the distance to and three-dimensional shape of an object in a robot traveling direction.

The robot drive signal generating unit 214 generates a robot drive signal for enabling the robot to travel on a route on which the robot can safely travel without colliding with an obstacle on the basis of information on the distance to and the three-dimensional shape of an object in the robot traveling direction, the information being detection information of the sensor detection signal analysis unit 211, and outputs the generated robot drive signal to the robot driving unit 203.

The robot driving unit 203 drives the robot on the basis of the robot drive signal input from the robot drive signal generating unit 214.

These processes enable the robot to travel safely without colliding with an obstacle.

Note that in the configuration of the autonomous traveling robot 30 illustrated in FIG. 18, the configuration of the data processing unit 202 may be executed in a server connected to the autonomous traveling robot 30.

Figure 19:
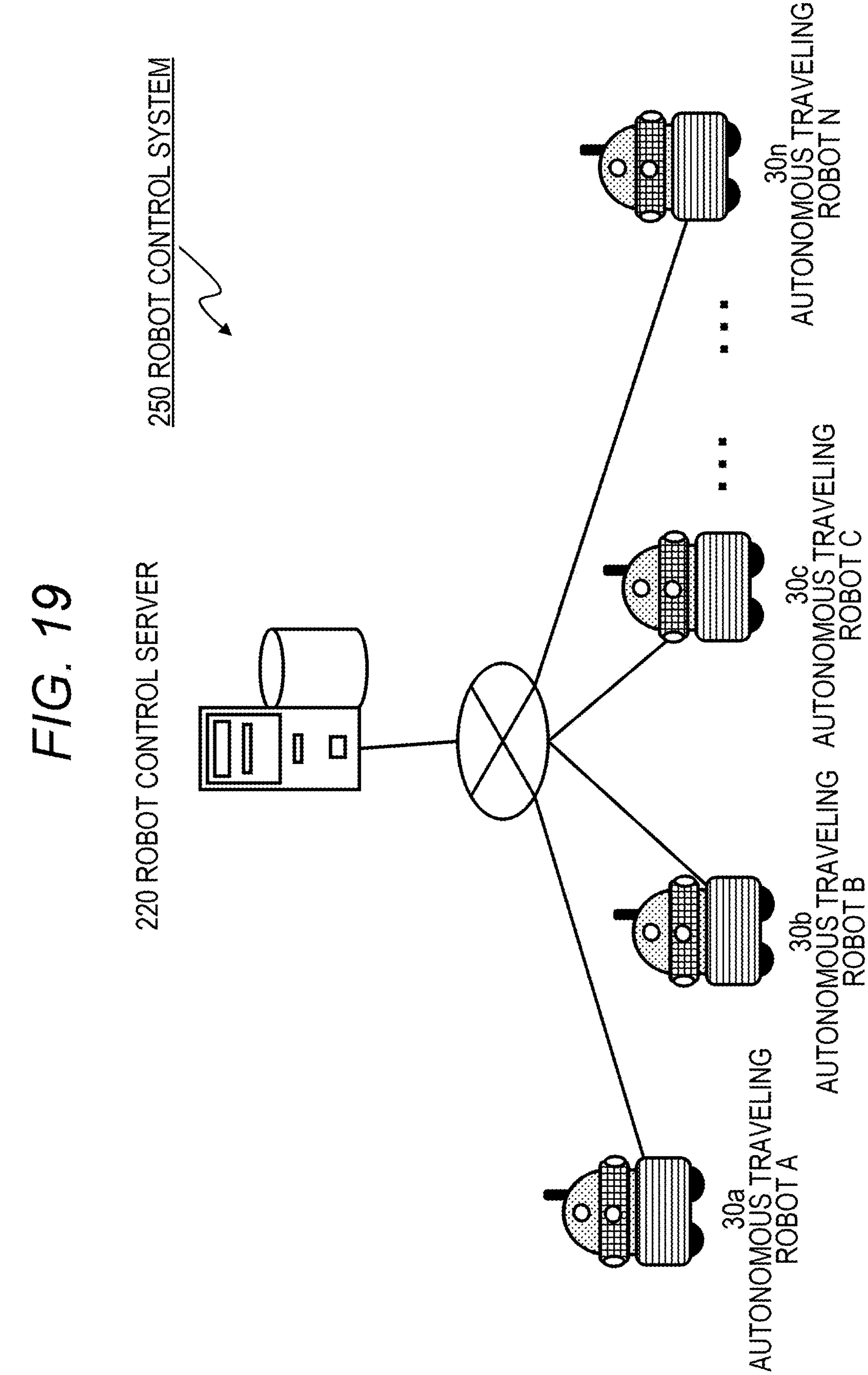
FIG. 19 is a diagram for explaining an example of a robot control system in which a plurality of autonomous traveling robots and a robot control server are connected via a communication network.

For example, as illustrated in FIG. 19, a robot control system 250 is configured in which a plurality of autonomous traveling robots a to n, 130*a* to *n* and a robot control server 220 are connected via a communication network.

Each of the plurality of autonomous traveling robots a to n, 30*a* to *n* has a configuration other than the data processing unit 202 in the configuration illustrated in FIG. 18, that is, sensors 1 to N, 201-1 to N, a robot driving unit 203, and furthermore, a communication unit.

The robot control server 220 includes the configuration of the data processing unit 202 described with reference to FIG. 18 and a communication unit, and executes the processing of the data processing unit 202 described with reference to FIG. 18. That is, the robot control server 220 executes a process of analyzing sensor detection data of each of the plurality of autonomous traveling robots a to n, 30*a* to *n*, an object distance calculation process, and furthermore, a robot drive signal generation process, and the like, and transmits a sensor control signal and a robot drive signal to each of the autonomous traveling robots a to n, 100*a* to *n*.

Each of the autonomous traveling robots a to n, 100*a* to *n* travels on the basis of the robot drive signal received from the robot control server 220. Moreover, the detection direction and detection accuracy of the sensor is controlled on the basis of the sensor control signal received from the robot control server 220.

As described above, a configuration may be adopted in which a device such as one server intensively controls each of the plurality of autonomous traveling robots a to n, 100*a* to *n*.

5. Sequence of Light Output Control Process Executed by Light Output Control Device of Present Disclosure Next, a sequence of the light output control process executed by the light output control device of the present disclosure will be described.

Figure 20:
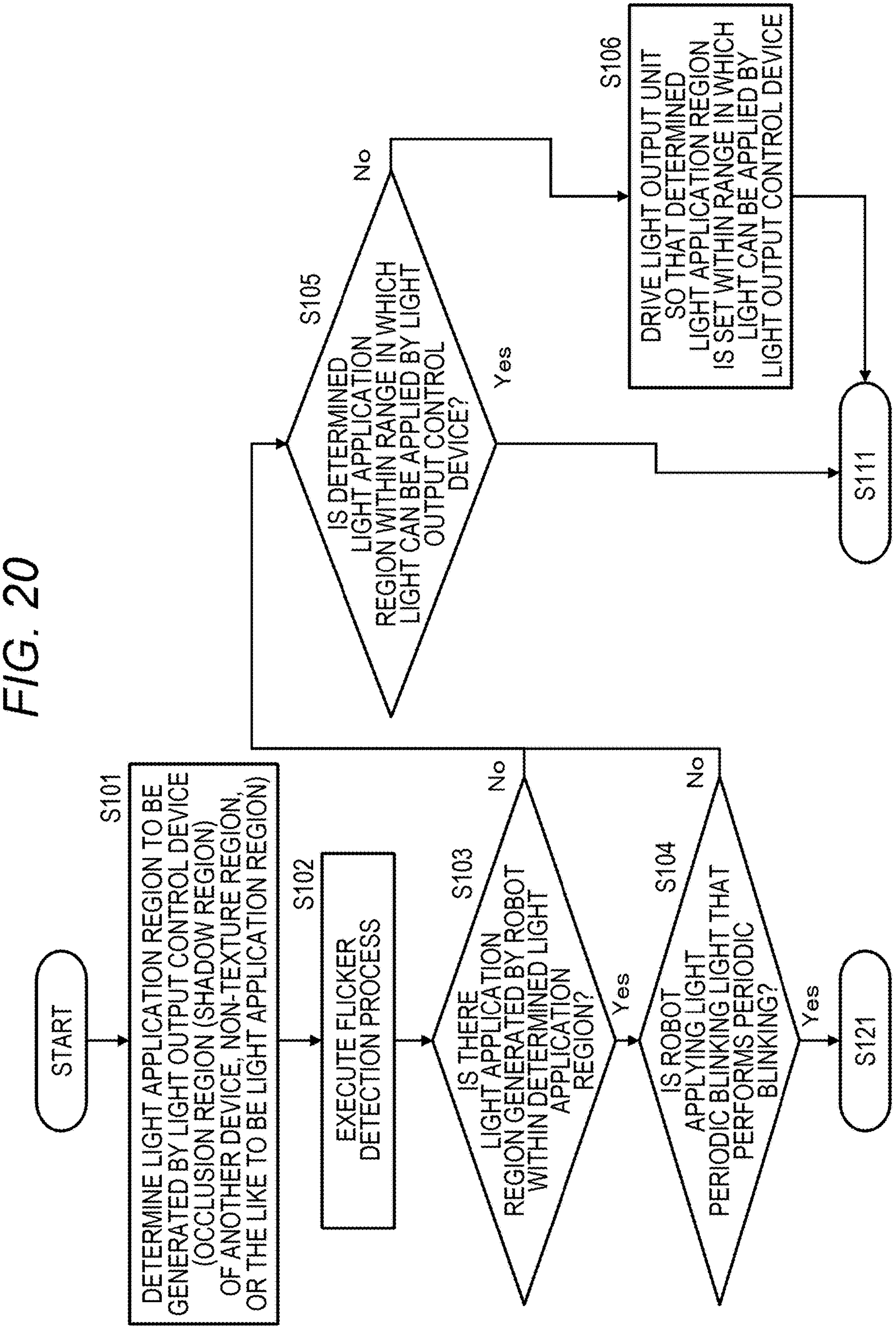
FIG. 20 is a diagram illustrating a flowchart describing a sequence of a light output control process executed by the light output control device of the present disclosure.
Figure 21:
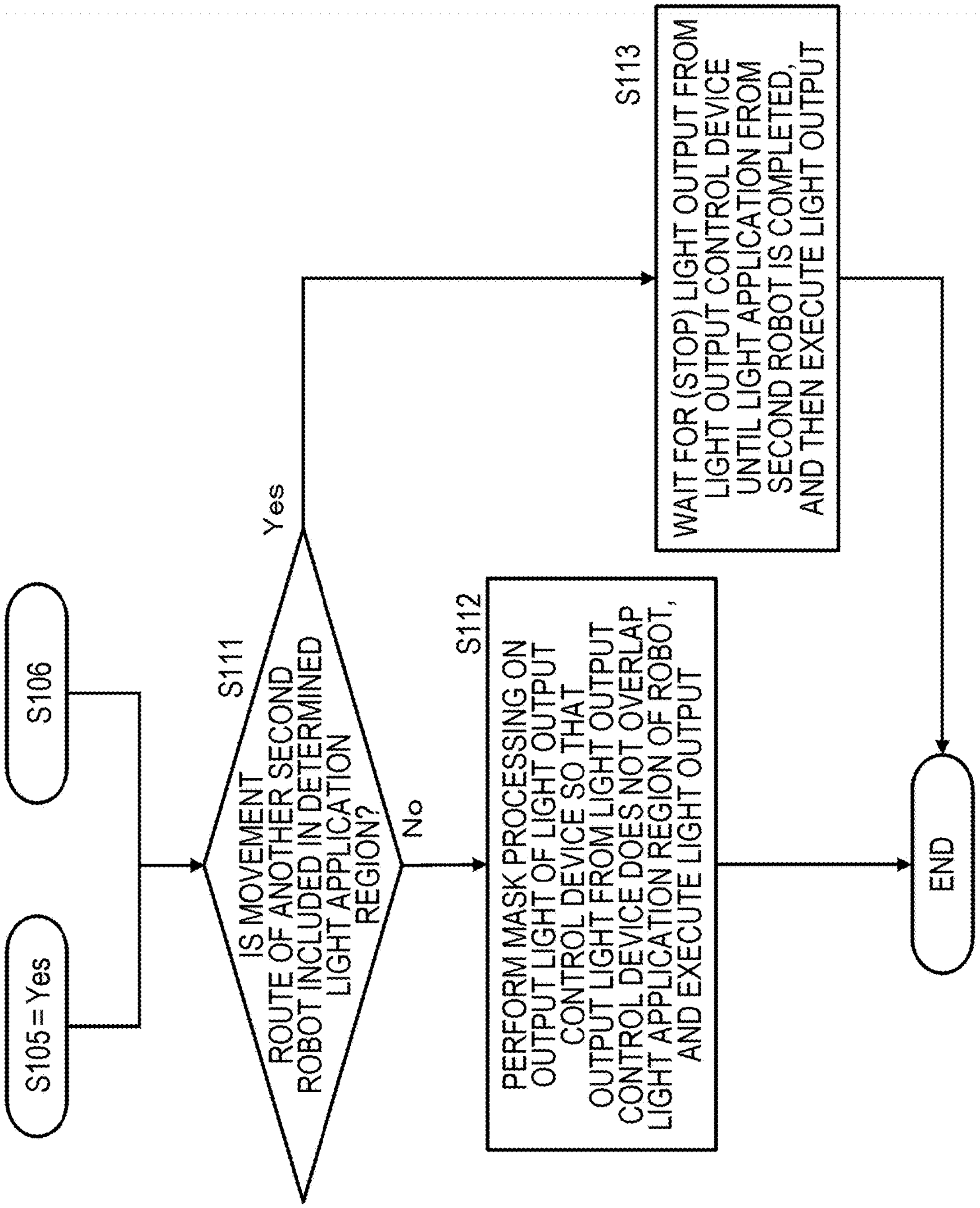
FIG. 21 is a diagram illustrating a flowchart describing the sequence of the light output control process executed by the light output control device of the present disclosure.
Figure 22:
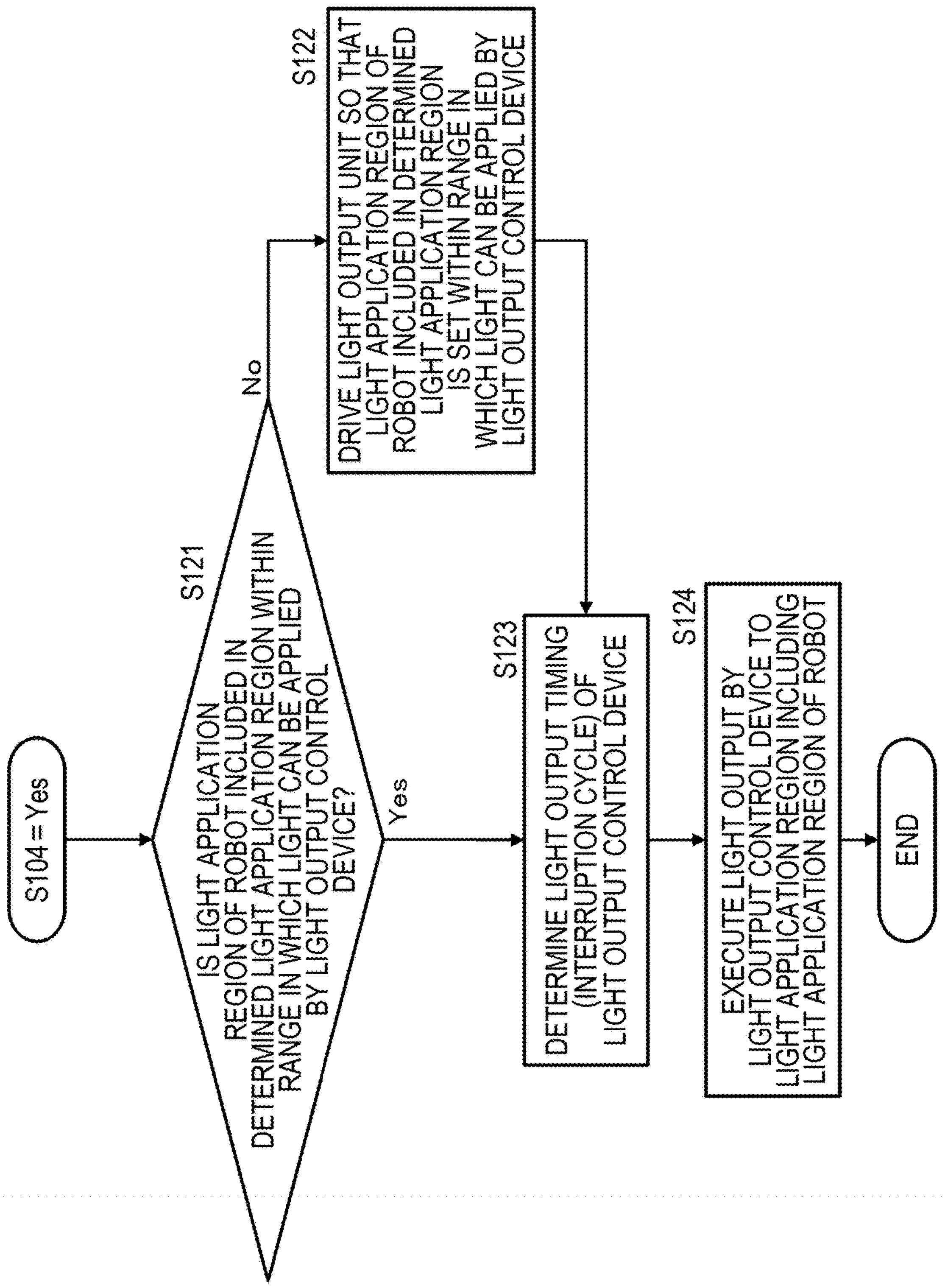
FIG. 22 is a diagram illustrating a flowchart describing the sequence of the light output control process executed by the light output control device of the present disclosure.

FIGS. 20, 21, and 22 are diagrams illustrating a flowchart describing the sequence of the light output control process executed by the light output control device of the present disclosure.

Note that the process according to the flowchart illustrated in FIGS. 20, 21, and 22 is mainly executed in the data processing unit 105 of the light output control device 100 having the configuration illustrated in FIG. 7, for example.

The process can be executed according to a program stored in a storage unit, not illustrated in FIG. 7, of the light output control device 100.

The data processing unit 105 of the light output control device 100 includes a processor such as a CPU having a program execution function, and can execute the process according to the flowchart illustrated in FIGS. 20, 21, and 22 according to the program stored in the storage unit.

Note that the flow illustrated in FIGS. 20, 21, and 22 can also be executed as processing of the light output control server 180 that can communicate with the light output control device 100 described above with reference to FIG. 17.

Hereinafter, the process of each step of the flow illustrated in FIGS. 20, 21, and 22 will be sequentially described.

(Step S101)

First, in step S101, the data processing unit 105 of the light output control device 100 determines a light application region to be generated by the light output control device.

The light application region determination process in step S101 is a process executed by the light application region determination unit 121 in the processing determination unit 120 of the data processing unit 105 of the light output control device 100 illustrated in FIG. 7.

The light application region determination unit 121 determines the light application region of the light output control device according to analysis information input from the occlusion region (shadow region) analysis unit 111 of the data analysis unit 110 and the robot applying light analysis unit 112.

Specifically, on the basis of the occlusion region (shadow region) information analyzed by the occlusion region (shadow region) analysis unit 111, the light application region determination unit 121 determines the optimum light application region for eliminating or maximally reducing the occlusion region (shadow region). Moreover, an optimum light application region that does not disturb the robot applying light is determined on the basis of the robot applying light analysis information analyzed by the robot applying light analysis unit 112.

(Step S102)

Next, in step S102, the data processing unit 105 of the light output control device 100 executes a flicker detection process.

The flicker detection process in step S102 is a process executed by the robot applying light analysis unit 112 in the data analysis unit 110 of the data processing unit 105 of the light output control device 100 illustrated in FIG. 7.

As described above with reference to FIG. 7, the robot applying light analysis unit 112 inputs flicker detection data 153 including information on the presence or absence of a flicker (blinking light) and information enabling analysis of the light emission time and the light emission cycle of the flicker from the flicker detection sensor 103.

The robot applying light analysis unit 112 uses the data to execute the process of judging whether applied light output from the robot is continuous output light or pulse light having a blinking output pattern in which output ON/OFF is repeated.

(Step S103)

Next, in step S103, the data processing unit 105 of the light output control device 100 determines whether or not there is a light application region generated by the robot within the light application region determined in step S101.

This process is a process executed by the light output timing determination unit 122 in the processing determination unit 120 of the data processing unit 105 of the light output control device 100 illustrated in FIG. 7.

The sequence illustrated in this flow is a processing sequence in a case where the process of determining the light output timing in the light output timing determination unit 122 is executed only in a case where the light application region determined by the light application region determination unit 121 includes a region overlapping robot applying light.

In a case where it is judged in step S103 that there is a light application region generated by the robot within the light application region determined in step S101, the processing proceeds to step S104.

In contrast, in a case where it is judged in step S103 that there is no light application region generated by the robot within the light application region determined in step S101, the processing proceeds to step S105.

(Step S104)

In a case where it is judged in step S103 that there is a light application region generated by the robot within the light application region determined in step S101, the processing proceeds to step S104.

In this case, in step S104, the data processing unit 105 of the light output control device 100 judges whether or not the robot applying light is periodic blinking light that performs periodic blinking.

The judging process in step S104 is a process executed by the robot applying light analysis unit 112 in the data analysis unit 110 of the data processing unit 105 of the light output control device 100 illustrated in FIG. 7.

The robot applying light analysis unit 112 judges whether or not the robot applying light is periodic blinking light that performs periodic blinking on the basis of the result of the flicker detection process in step S102.

In a case where it is judged that the robot applying light is periodic blinking light, the processing proceeds to step S121.

In a case where it is judged that the robot applying light is not periodic blinking light, the processing proceeds to step S105.

(Step S105)

In a case where it is judged in step S104 that the robot applying light is not periodic blinking light, the processing proceeds to step S105.

In this case, in step S105, the data processing unit 105 of the light output control device 100 judges whether or not the light application region of the light output control device 100 determined in step S101 is within the range in which light can be applied by the light output control device 100.

This process is a process executed by the control unit 130 of the data processing unit 105 of the light output control device 100 illustrated in FIG. 7.

In a case where it is judged that the light application region of the light output control device 100 determined in step S101 is within the range in which light can be applied by the light output control device 100, the processing proceeds to step S111.

In contrast, in a case where it is judged that the light application region of the light output control device 100 determined in step S101 is not within the range in which light can be applied by the light output control device 100, the processing proceeds to step S106.

(Step S106)

In a case where it is judged in step S105 that the light application region of the light output control device 100 determined in step S101 is not within the range in which light can be applied by the light output control device 100, the following process is executed in step S106.

In this case, in step S106, the data processing unit 105 of the light output control device 100 drives the light output unit 106 so that the light application region determined in step S101 is set within the range in which light can be applied by the light output control device 100.

This process is a process executed by the control unit 130 of the data processing unit 105 of the light output control device 100 illustrated in FIG. 7.

In step S106, if the light application region of the light output control device 100 determined in step S101 is set within the range in which light can be applied by the light output control device 100, the processing proceeds to step S111.

(Step S111)

The process in step S111 is executed after any one of the following processes.

(a) in a case where it is judged in step S105 that the light application region of the light output control device 100 determined in step S101 is within the range in which light can be applied by the light output control device 100, or (b) in a case where it is judged in step S105 that the light application region of the light output control device 100 determined in step S101 is not within the range in which light can be applied by the light output control device 100, and the process of setting the light application region within the range in which light can be applied by the light output control device 100 is completed in step S106, in these cases, the processes in step S111 and subsequent steps are executed.

In this case, in step S111, the data processing unit 105 of the light output control device 100 judges whether or not a movement route of the other second robot other than the current processing target robot is included in the light application region of the light output control device 100 determined in step S101.

This process is a process executed by the light application region determination unit 121 in the processing determination unit 120 of the data processing unit 105 of the light output control device 100 illustrated in FIG. 7.

The light application region determination unit 121 estimates various movement routes of the robots according to time-series analysis information input from the occlusion region (shadow region) analysis unit 111 and the robot applying light analysis unit 112 of the data analysis unit 110 in the preceding stage, and judges whether or not a movement route of the other second robot other than the current processing target robot is included in the light application region of the light output control device 100 determined in step S101.

In a case where it is judged that the movement route of the second robot is not included in the light application region of the light output control device 100, the processing proceeds to step S112.

In contrast, in a case where it is judged that the movement route of the second robot is included in the light application region of the light output control device 100, the processing proceeds to step S113.

(Step S112)

In a case where it is judged in step S111 that the movement route of the second robot is not included in the light application region of the light output control device 100, the processing proceeds to step S112.

In this case, in step S112, the data processing unit 105 of the light output control device 100 performs mask processing on output light of the light output control device so that output light from the light output control device does not overlap the light application region of the robot that is the current processing target, and executes light output.

The process in step S112 is a process executed by the processing determination unit 120 and the control unit 130 of the data processing unit 105 of the light output control device 100 illustrated in FIG. 7.

A specific example of the process in step S112 will be described with reference to FIGS. 23 and 24.

Figure 23:
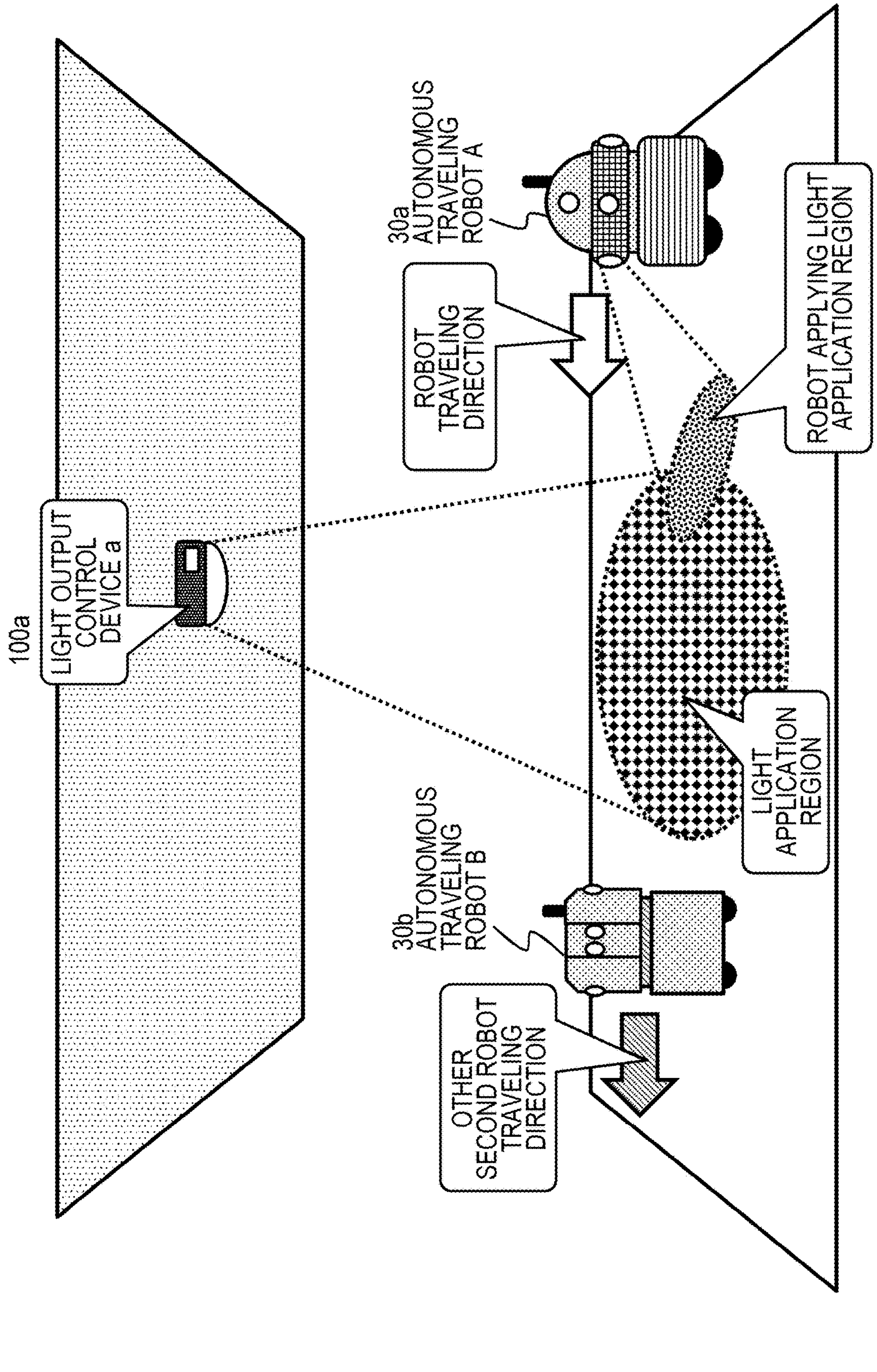
FIG. 23 is a diagram for explaining a specific example of the light output control process executed by the light output control device of the present disclosure.

FIG. 23 illustrates the light output control device a, 100*a* that is executing the process according to this flow, the autonomous traveling robot A, 30*a* that is the current processing target robot, and the autonomous traveling robot B, 30*b* that is the other second robot.

The example illustrated in FIG. 23 is a process in a case where it is judged that the movement route of the autonomous traveling robot B, 30*b*, which is the second robot, is not included in the light application region of the light output control device a, 100*a*.

In this case, in step S112, the data processing unit 105 of the light output control device 100 performs mask processing on output light of the light output control device so that output light from the light output control device does not overlap the light application region of the robot that is the current processing target, and executes light output.

Figure 24:
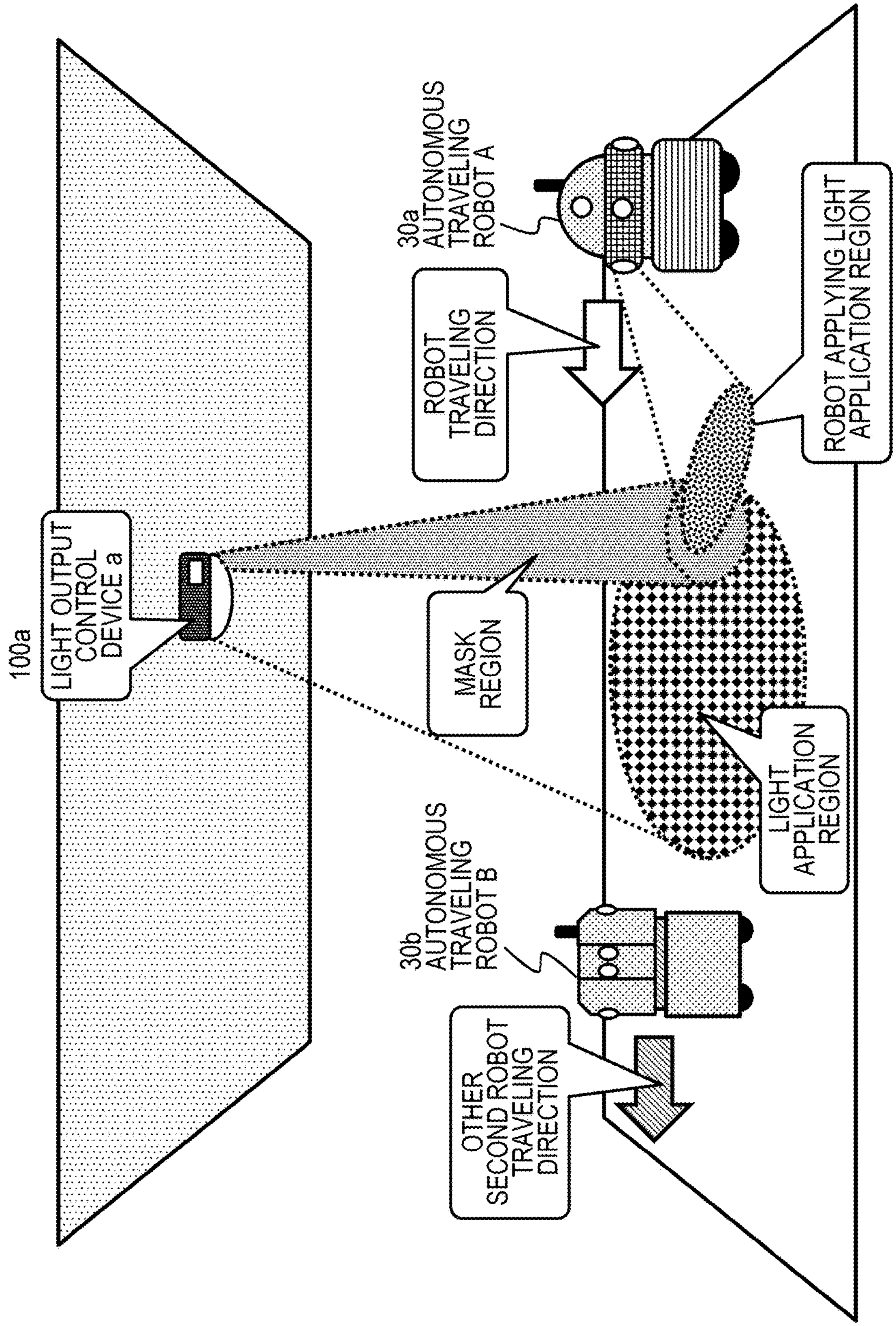
FIG. 24 is a diagram for explaining a specific example of the light output control process executed by the light output control device of the present disclosure.

A specific example of the mask processing is illustrated in FIG. 24. As illustrated in FIG. 24, in step S112, the light output control device 100*a*, 100*a* performs mask processing on output light of the light output control device so that output light from the light output control device does not overlap the light application region of the robot (autonomous traveling robot A, 30*a*) that is the current processing target, and executes light output.

The mask region illustrated in FIG. 24 is a region in which output light of the light output control device a, 100*a* is blocked. Therefore, only the robot applying light is applied to the floor surface corresponding to the mask region.

This mask processing enables the autonomous traveling robot A, 30*a* to accurately analyze the object distance and the three-dimensional shape of the floor according to the stereo camera scheme by capturing an image of the region to which only the robot applying light is applied, and to travel safely on the basis of highly accurate analysis.

(Step S113)

In contrast, in a case where it is judged in step S111 that the movement route of the second robot is included in the light application region of the light output control device 100, the processing proceeds to step S113.

In this case, in step S113, the data processing unit 105 of the light output control device 100 waits for (stops) light output from the light output control device 100 until light application from the other second robot different from the robot that is the current processing target is completed, and then executes light output.

The process in step S113 is a process executed by the processing determination unit 120 and the control unit 130 of the data processing unit 105 of the light output control device 100 illustrated in FIG. 7.

A specific example of the process in step S113 will be described with reference to FIG. 25.

Figure 25:
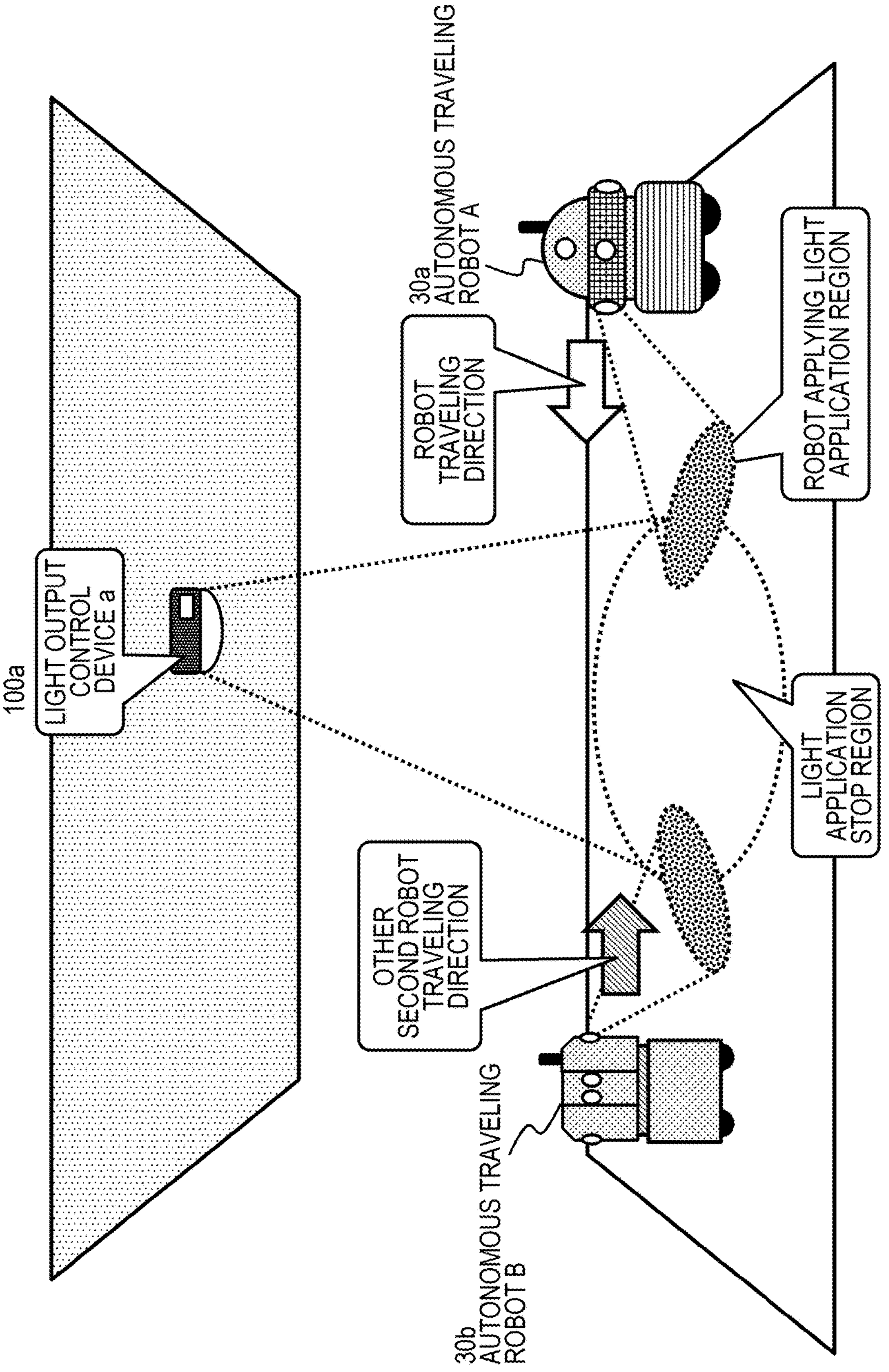
FIG. 25 is a diagram for explaining a specific example of the light output control process executed by the light output control device of the present disclosure.

FIG. 25 illustrates the light output control device a, 100*a* that is executing the process according to this flow, the autonomous traveling robot A, 30*a* that is the current processing target, and the autonomous traveling robot B, 30*b* that is the other second robot.

The example illustrated in FIG. 25 is a process in a case where it is judged that the movement route of the autonomous traveling robot B, 30*b* that is the second robot is included in the light application region of the light output control device a, 100*a*.

In this case, in step S113, the data processing unit 105 of the light output control device 100 waits for (stops) light output from the light output control device 100 until light application from the other second robot that is not the robot that is the current processing target robot is completed, and then executes light output.

This light output stop process enables each of both the autonomous traveling robot A, 30*a*, which is the current processing target robot, and the autonomous traveling robot B, 30*b*, which is the other second robot, to accurately analyze the object distance and the three-dimensional shape of the floor according to the stereo camera scheme by capturing an image of the region to which only robot applying light from the robot itself is applied, and to travel safely on the basis of highly accurate analysis.

(Step S121)

Next, processes in step S121 and subsequent steps illustrated in FIG. 22 will be described.

Step S121 is a process executed in a case where it is judged in step S103 illustrated in FIG. 20 that there is a light application region generated by the robot within the light application region determined in step S101, and moreover, it is judged in step S104 illustrated in FIG. 20 that the robot applying light is periodic blinking light that performs periodic blinking.

In this case, in step S121, the data processing unit 105 of the light output control device 100 judges whether or not the application region of the robot applying light included in the light application region determined in step S101 is within the range in which light can be applied by the light output control device 100.

This process is a process executed by the control unit 130 of the data processing unit 105 of the light output control device 100 illustrated in FIG. 7.

In a case where it is judged that the application region of the robot applying light included in the light application region of the light output control device 100 determined in step S101 is within the range in which light can be applied from the light output control device 100, the processing proceeds to step S123.

In contrast, in a case where it is judged that the application region of the robot applying light included in the light application region of the light output control device 100 determined in step S101 is not within the range in which light can be applied from the light output control device 100, the processing proceeds to step S122.

(Step S122)

In step S121, in a case where it is judged that the application region of the robot applying light included in the light application region of the light output control device 100 determined in step S101 is not within the range in which light can be applied from the light output control device 100, the following process is executed in step S122.

In this case, in step S122, the data processing unit 105 of the light output control device 100 drives the light output unit 106 so that the application region of the robot applying light included in the light application region determined in step S101 is set within the range in which light can be applied by the light output control device 100.

This process is a process executed by the control unit 130 of the data processing unit 105 of the light output control device 100 illustrated in FIG. 7.

In step S122, if the application region of the robot applying light included in the light application region of the light output control device 100 determined in step S101 is set within the range in which light can be applied from the light output control device 100, the processing proceeds to step S123.

(Step S123)

The process in step S123 is executed after any one of the following processes.

(a) in a case where it is judged in step S121 that the application region of robot applying light included in the light application region of the light output control device 100 determined in step S101 is within the range in which light can be applied by the light output control device 100, or (b) in a case where it is judged in step S121 that the application region of robot applying light included in the light application region of the light output control device 100 determined in step S101 is not within the range in which light can be applied by the light output control device 100, and the process of setting the application region of the robot applying light included in the light application region within the range in which light can be applied by the light output control device 100 is completed in step S122, in these cases, the processes in step S123 and subsequent steps are executed.

In this case, the data processing unit 105 of the light output control device 100 determines the light output timing (interruption cycle) of the light output control device 100 in step S123.

This process is a process executed by the light output timing determination unit 122 in the processing determination unit 120 of the data processing unit 105 of the light output control device 100 illustrated in FIG. 7.

The light output timing determination unit 122 determines an optimum light output timing that does not disturb the robot applying light on the basis of the robot applying light analysis information analyzed by the robot applying light analysis unit 112.

Specifically, for example, the light output timing is determined so as to have the setting of the blinking pattern as described above with reference to FIG. 16 (2).

FIG. 16 illustrates each of the following blinking patterns.

(1) The blinking pattern of the robot applying light (2) The output light blinking pattern of the light output control device The blinking pattern of the robot applying light illustrated in FIG. 16 (1) is the blinking pattern described with reference to FIG. 15, and is the blinking pattern of the robot applying light analyzed by the robot applying light analysis unit 112 of the data analysis unit 110 of the light output control device a, 100*a*.

The light output timing determination unit 122 of the light output control device 100 determines the optimum light output timing that does not disturb the robot applying light on the basis of the blinking pattern of the robot applying light illustrated in FIG. 16 (1).

Specifically, the output timing is determined such that applied light from the light output control device 100 is output only in a period in which robot applying light is not output in the blinking pattern of the robot applying light illustrated in FIG. 16 (1) (OFF period in FIG. 16 (1)).

That is, light output timing is determined so as to have the setting of the blinking pattern as illustrated in FIG. 16 (2).

(Step S124)

Next, in step S124, the data processing unit 105 of the light output control device 100 executes light output by the light output control device to a light application region including the light application region of the robot.

The process in step S124 is a process executed by the control unit 130 and the light output unit 106 of the data processing unit 105 of the light output control device 100 illustrated in FIG. 7.

Specifically, light output is executed according to the blinking pattern as illustrated in FIG. 16 (2).

As a result, output light from the light output control device 100 is applied at an optimum light output timing that does not disturb the robot applying light.

Figure 26:
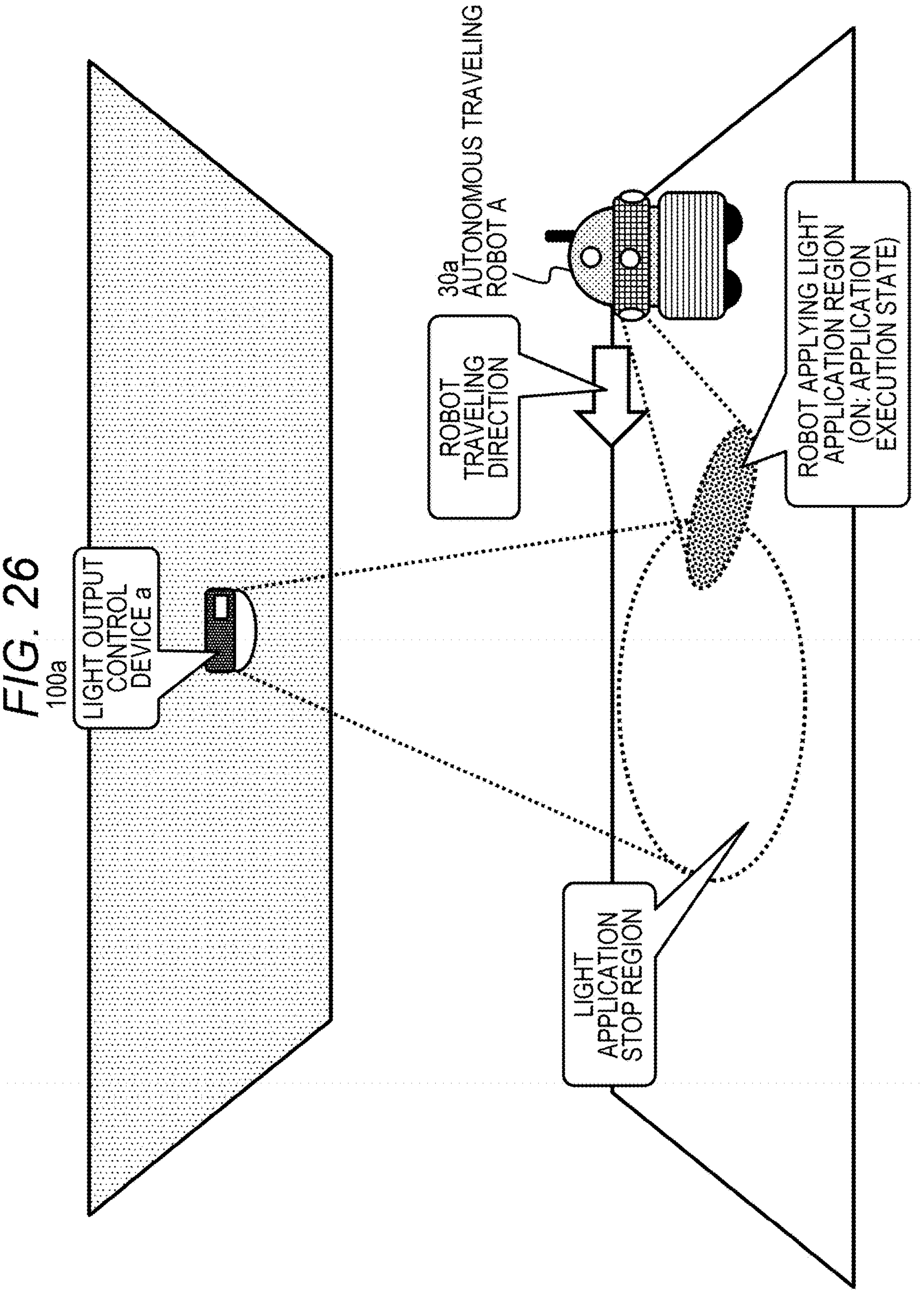
FIG. 26 is a diagram for explaining a specific example of the light output control process executed by the light output control device of the present disclosure.
Figure 27:
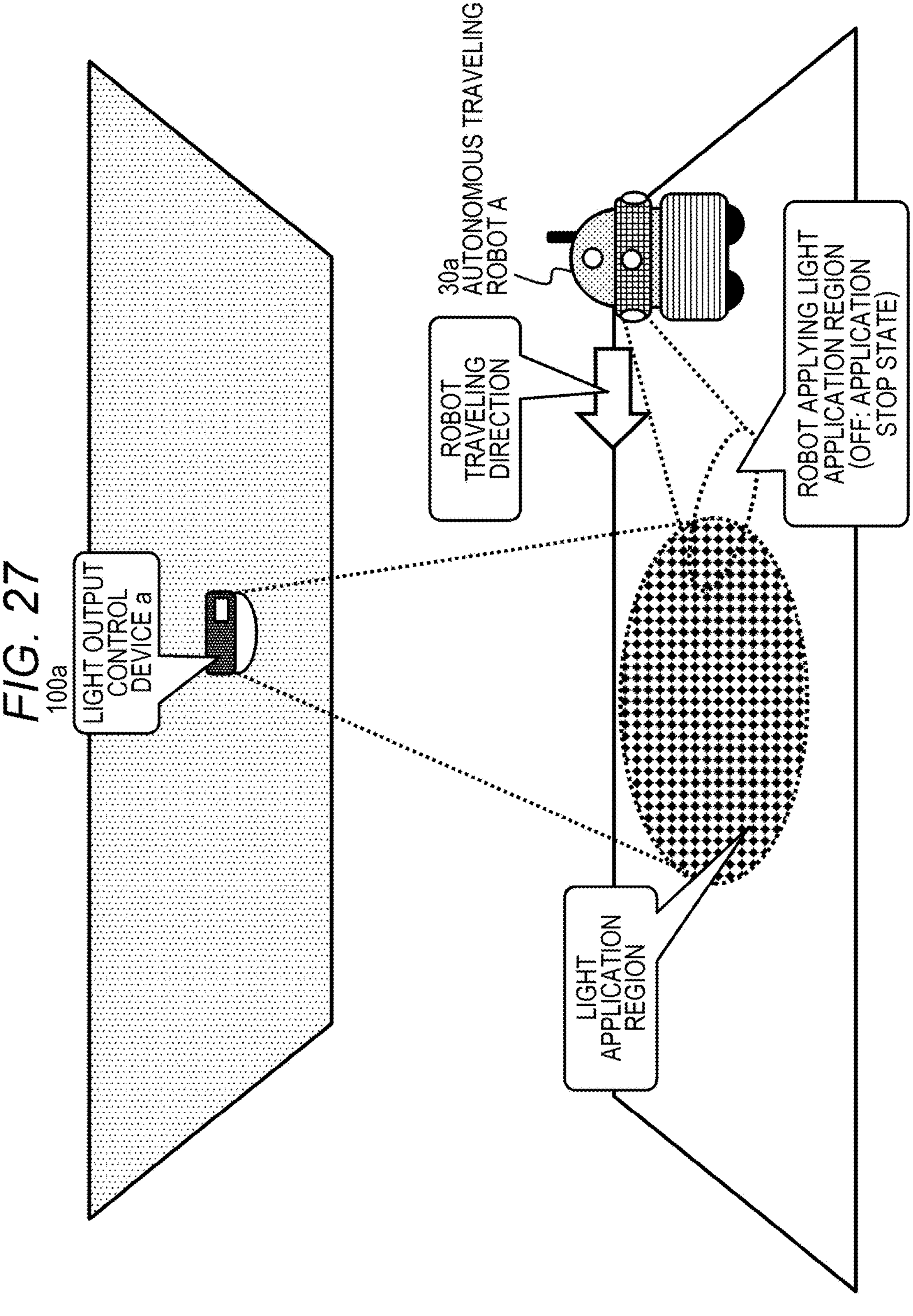
FIG. 27 is a diagram for explaining a specific example of the light output control process executed by the light output control device of the present disclosure.

Specifically, the control unit 130 of the light output control device 100 controls the output light so that the robot applying light output timing as illustrated in FIG. 26 and the output timing of the output light from the light output control device 100 as illustrated in FIG. 27 are alternately repeated.

Under such control, the output light from the light output control device 100 is applied at an optimum light output timing that does not disturb the robot applying light, and the autonomous traveling robot A, 30*a* can accurately analyze the object distance and the three-dimensional shape of the floor according to the stereo camera scheme by capturing an image of the region to which either the robot applying light or the output light from the light output control device 100 is applied, and can travel safely on the basis of highly accurate analysis.

6. Other Embodiments

Next, other embodiments different from the above-described embodiment of the light output control device will be described.

6-1. Embodiment Having Output Pattern Image Correction Unit

First, an embodiment including an output pattern image correction unit will be described.

As described above, for example, texture pattern light with a design is output from the light output unit 106 of the light output control device 100 of the present disclosure illustrated in FIG. 7, and is applied to a projection surface such as a robot traveling surface.

However, for example, in a case where the texture pattern light application surface is curved instead of a flat surface, or in a case where the application region is in an oblique direction of the light output unit 106 of the light output control device 100, the texture pattern light projected onto the application surface has a distorted pattern different from the texture pattern light output from the light output unit 106 of the light output control device 100 in some cases.

Specific examples will be described with reference to FIG. 28 and subsequent drawings.

Figure 28:
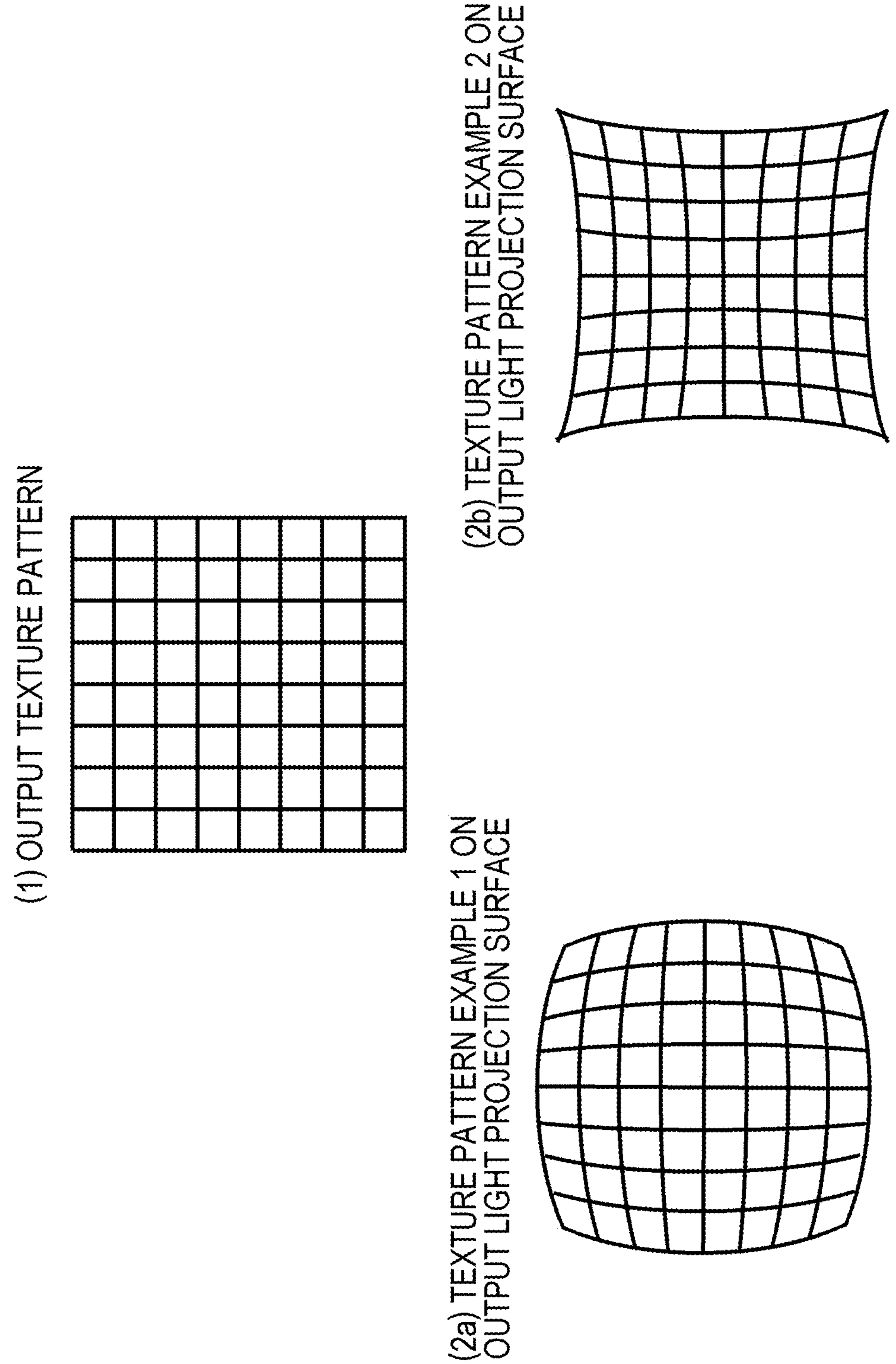
FIG. 28 is a view for explaining examples of texture pattern light output from a light output unit of the light output control device.

As an example, it is assumed that the texture pattern light output from the light output unit 106 of the light output control device 100 is a grid-like pattern illustrated in FIG. 28 (1).

The grid-like pattern light is applied to a projection surface such as a robot traveling surface. In a case where the grid-like pattern light application surface is curved instead of a flat surface, or in a case where the application region is in an oblique direction of the light output unit 106 of the light output control device 100, the pattern light projected onto the application surface has, for example, a distorted pattern as illustrated in (2a) or (2b) of FIG. 28 in some cases.

If feature point matching or object distance calculation is performed on the basis of the texture pattern light having such a distorted shape, there is a possibility that accuracy is reduced.

In order to solve this problem, the output pattern image correction unit is provided in the light output control device 100.

Figure 29:
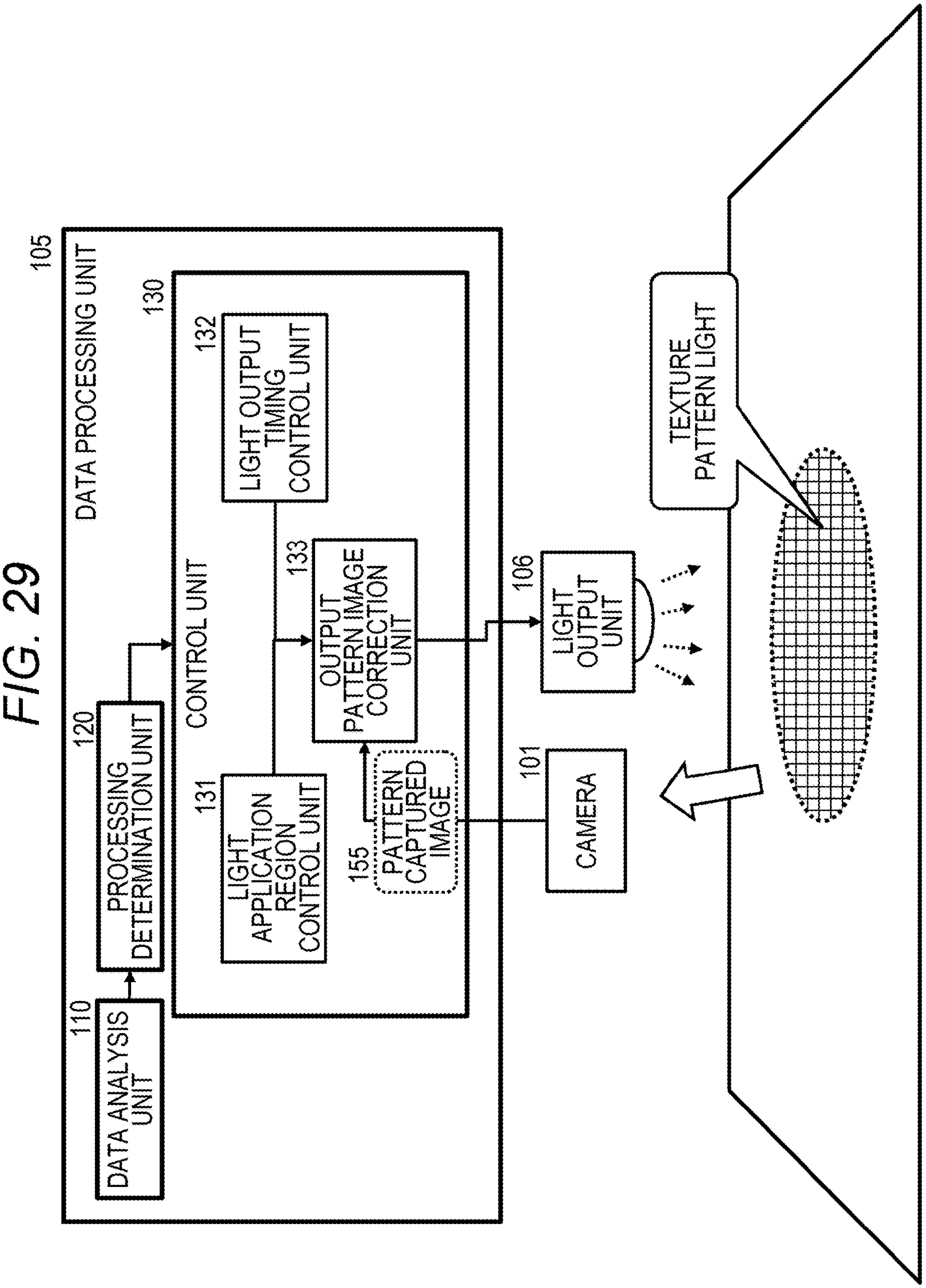
FIG. 29 is a diagram for explaining a configuration example of a control unit of a data processing unit of the light output control device.

A specific example is illustrated in FIG. 29.

FIG. 29 is a diagram illustrating a configuration of a control unit 130 of a data processing unit 105 of a light output control device 100 according to the present embodiment.

The configuration other than the control unit 130 is similar to the configuration described above with reference to FIG. 7.

As illustrated in FIG. 29, the control unit 130 of the data processing unit 105 of the light output control device 100 according to the present embodiment has a configuration in which an output pattern image correction unit 133 is added in addition to the light application region control unit 131 and the light output timing control unit 132 described above with reference to FIG. 7.

The output pattern image correction unit 133 executes a process of correcting the texture pattern output from a light output unit 106.

The output pattern image correction unit 133 inputs a pattern captured image 155 for the correction process.

As illustrated in the drawing, a camera 101 captures a texture pattern image applied to a pattern application surface. The output pattern image correction unit 133 inputs the pattern captured image 155 which is an image captured by the camera 101, and executes the process of correcting the texture pattern output from the light output unit 106 on the basis of the pattern captured image 155.

A specific example of the texture pattern correction process will be described with reference to FIG. 30.

Figure 30:
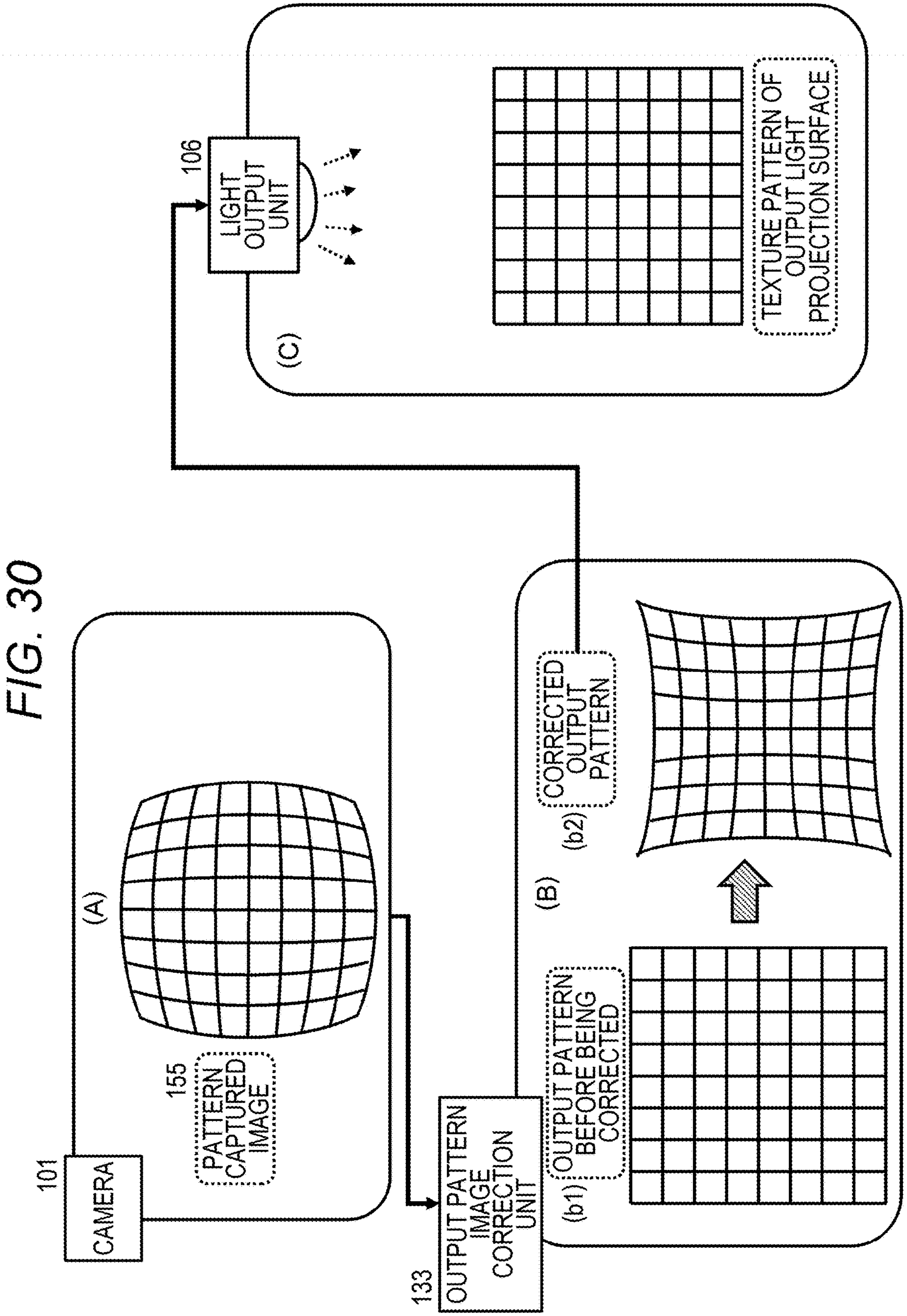
FIG. 30 is a diagram for explaining a specific example of a texture pattern correction process.

For example, it is assumed that the pattern captured image 155 captured by the camera 101 is the image illustrated in FIG. 30 (A).

As illustrated in FIG. 30 (B), the output pattern image correction unit 133 inputs the pattern captured image 155 which is an image captured by the camera 101, and executes a process of correcting the texture pattern output from the light output unit 106 on the basis of the pattern captured image 155.

In FIG. 30 (B), (b1) output pattern before being corrected (b2) corrected output pattern these texture patterns are illustrated.

(b1) The output pattern before being corrected is the current texture pattern output from the light output unit 106, and the pattern captured image 155 obtained by capturing this pattern with the camera 101 corresponds to the distorted grid-like pattern image illustrated in FIG. 30 (A).

The output pattern image correction unit 133 inputs the pattern captured image 155 which is the distorted grid-like pattern image illustrated in FIG. 30 (A), and executes a process of correcting the texture pattern output from the light output unit 106 on the basis of the pattern captured image 155.

For example, the texture pattern output from the light output unit 106 is corrected from (b1) the output pattern before being corrected to (b2) the corrected output pattern.

The pattern image thus corrected, that is, (b2) the corrected output pattern is output from the light output unit 106.

As a result, a grid-like texture pattern without distortion as illustrated in FIG. 30 (C) is applied to the application surface of the texture pattern, for example, a floor such as a robot traveling surface.

For example, an autonomous traveling robot 30 captures the texture pattern without distortion with the camera, and performs feature point matching and object distance calculation according to a stereo camera scheme. By using the texture pattern without distortion corrected in this manner, a feature point matching process and an object distance calculation process with high accuracy can be performed.

6-2. Embodiment in which Light Output Control Device is Installed on Traveling Path of Automated Vehicle Next, an embodiment in which a light output control device is installed on a traveling path of an automated vehicle will be described.

An embodiment in which a light output control device is installed on a traveling path of an automated vehicle will be described with reference to FIG. 31.

Figure 31:
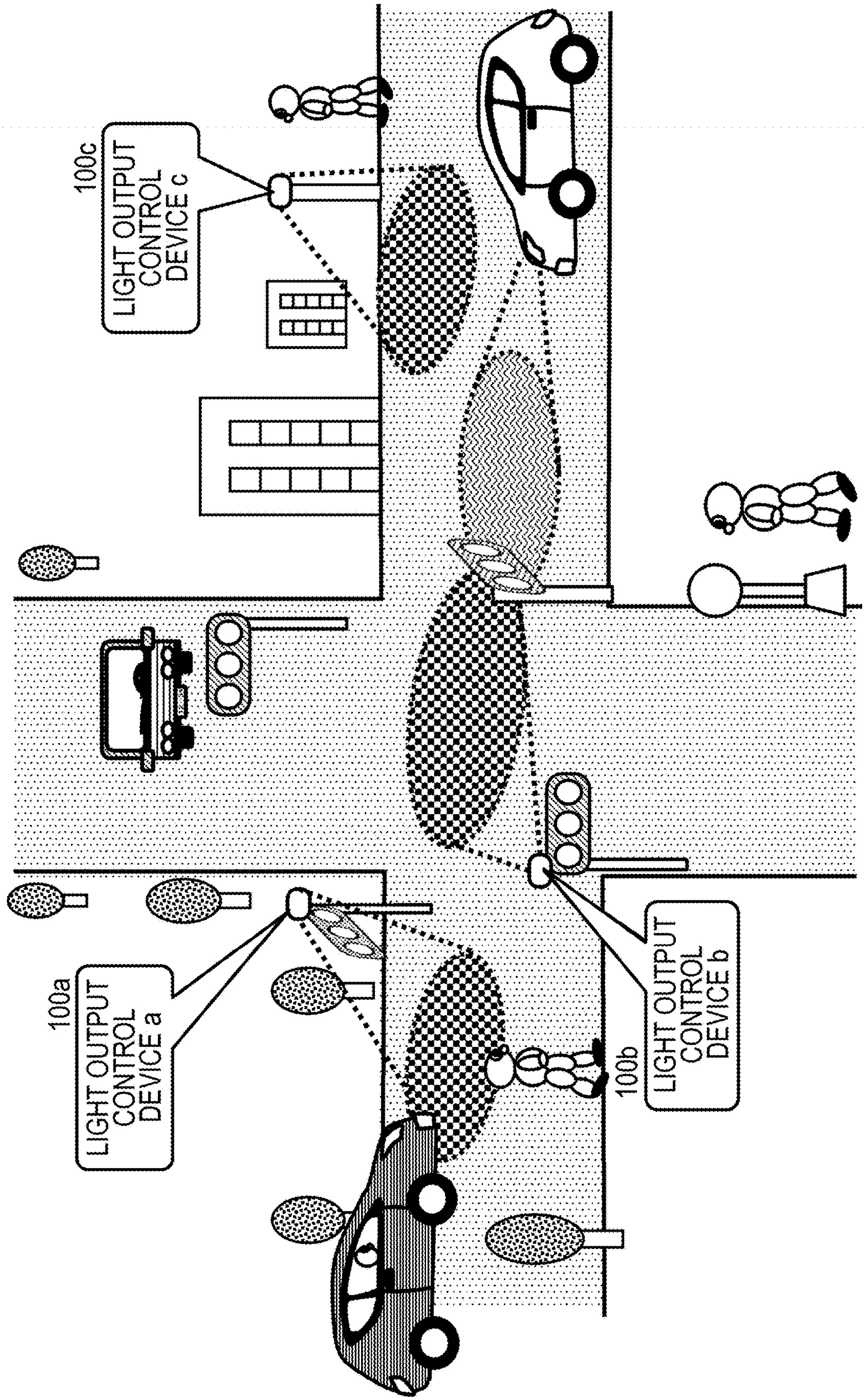
FIG. 31 is a view for explaining an embodiment in which the light output control device is installed on a traveling path of an automated vehicle.

FIG. 31 illustrates an example of the illumination infrastructure of a smart city. The vehicle is an automated vehicle, and performs automated driving by using detection information of various sensors including a camera.

As illustrated in the drawing, the light output control device 100 of the present disclosure is mounted on part of the infrastructure such as a traffic light or a pole provided on a road.

The light output control device 100 outputs texture pattern light.

The automated vehicle captures an image of the road or the like to which texture pattern light output from the light output control device 100 is applied with a stereo camera, executes a feature point matching process, an object distance calculation process, and the like by using the captured image, acquires information such as an obstacle in a traveling direction of the vehicle, and performs safe automated driving.

6-3. Embodiment in which Light Output Control Device is Mounted on Drone

Next, an embodiment in which a light output control device is mounted on a drone will be described.

Figure 32:
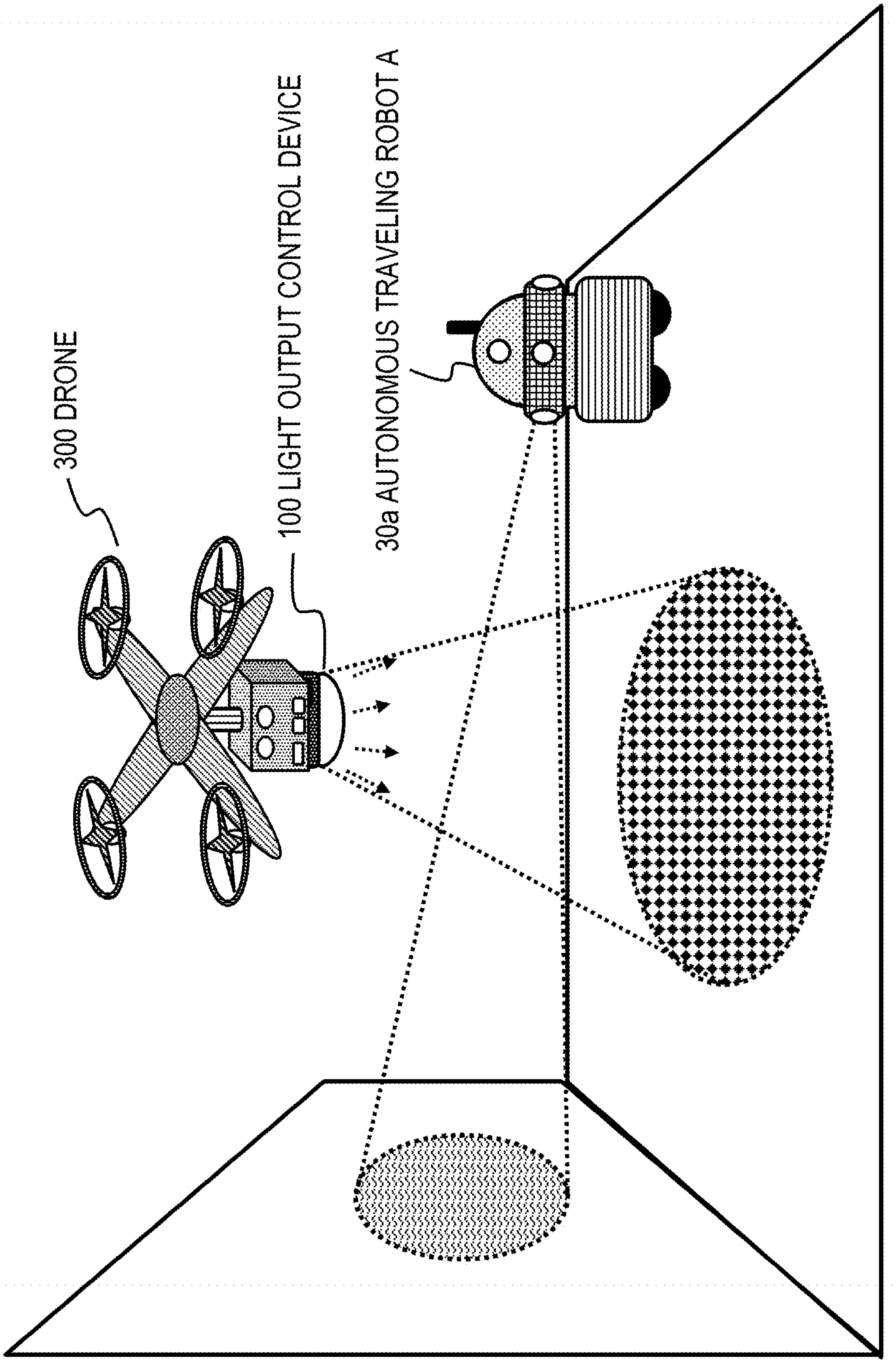
FIG. 32 is a view for explaining an embodiment in which the light output control device is mounted on a drone.

FIG. 32 is a view for explaining an embodiment in which a light output control device is mounted on a drone.

As illustrated in FIG. 32, a light output control device 100 is mounted on a drone 300.

In many cases, a manually operated drone cannot fly in a dark place such as nighttime. However, as illustrated in FIG. 32, the light output control device 100 is mounted on the drone 300, and texture pattern light is output from the light output control device 100.

The autonomous traveling robot A, 30*a* can analyze the object distance and the three-dimensional shape of a pattern light application surface by capturing an image of the application surface of the pattern light with a camera and analyzing the captured image, and can autonomously move even at night, in a warehouse, or the like without providing additional illumination.

Note that the drone 300 itself captures an image of the application surface of the pattern light with the camera of the light output control device 100 mounted on the drone 300 and analyzes the captured image, and therefore can analyze the object distance and the three-dimensional shape of the pattern light application surface and can fly while avoiding obstacles.

6-4. Application Example of Light Output Control Device in Advanced Driver-Assistance System (ADAS)

Next, an application example of the light output control device in an advanced driver-assistance system (ADAS) will be described.

An advanced driver-assistance system (ADAS) is a system such as an automated driving system that performs automated driving by using surrounding environment information acquired by a sensor of an automobile, and a system that issues a warning or the like to a driver.

Figure 33:
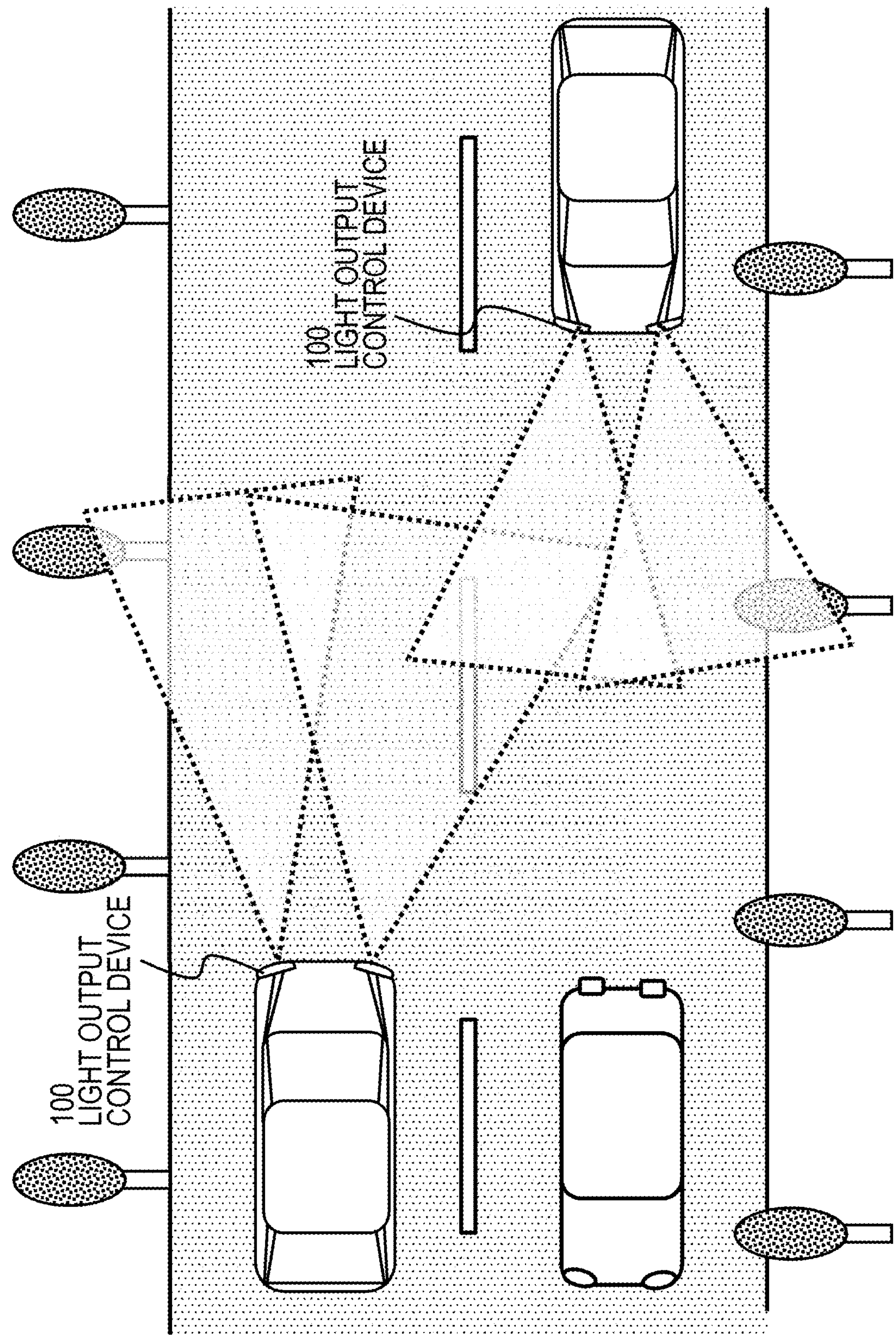
FIG. 33 is a view illustrating an embodiment in which the light output control device of the present disclosure is used in an advanced driver-assistance system (ADAS).

FIG. 33 is a view illustrating an embodiment in which the light output control device of the present disclosure is used in an advanced driver-assistance system (ADAS).

A technology for avoiding applying a headlight to an oncoming vehicle has been put into practical use as an adaptive driving beam (ADB). With the advancement of automated driving technology, cars equipped with a large number of 3D cameras (LiDAR/ToF/stereo cameras) for recognizing space are expected to become widespread.

As illustrated in FIG. 33, the light output control device 100 of the present disclosure is mounted on a headlight applying unit of an automobile.

The light output control devices 100 of the headlight applying units of the respective vehicles communicate with each other.

With this configuration, for example, it is possible to perform a process of judging the light emission timing and the light application area of the oncoming vehicle and mutually adjusting the timing of sensing light emission.

6-5. Configuration for Reducing Headlight Glare (Dazzle) by Using Light Output Control Device Next, a configuration for reducing headlight glare (dazzle) by using the light output control device will be described.

Figure 34:
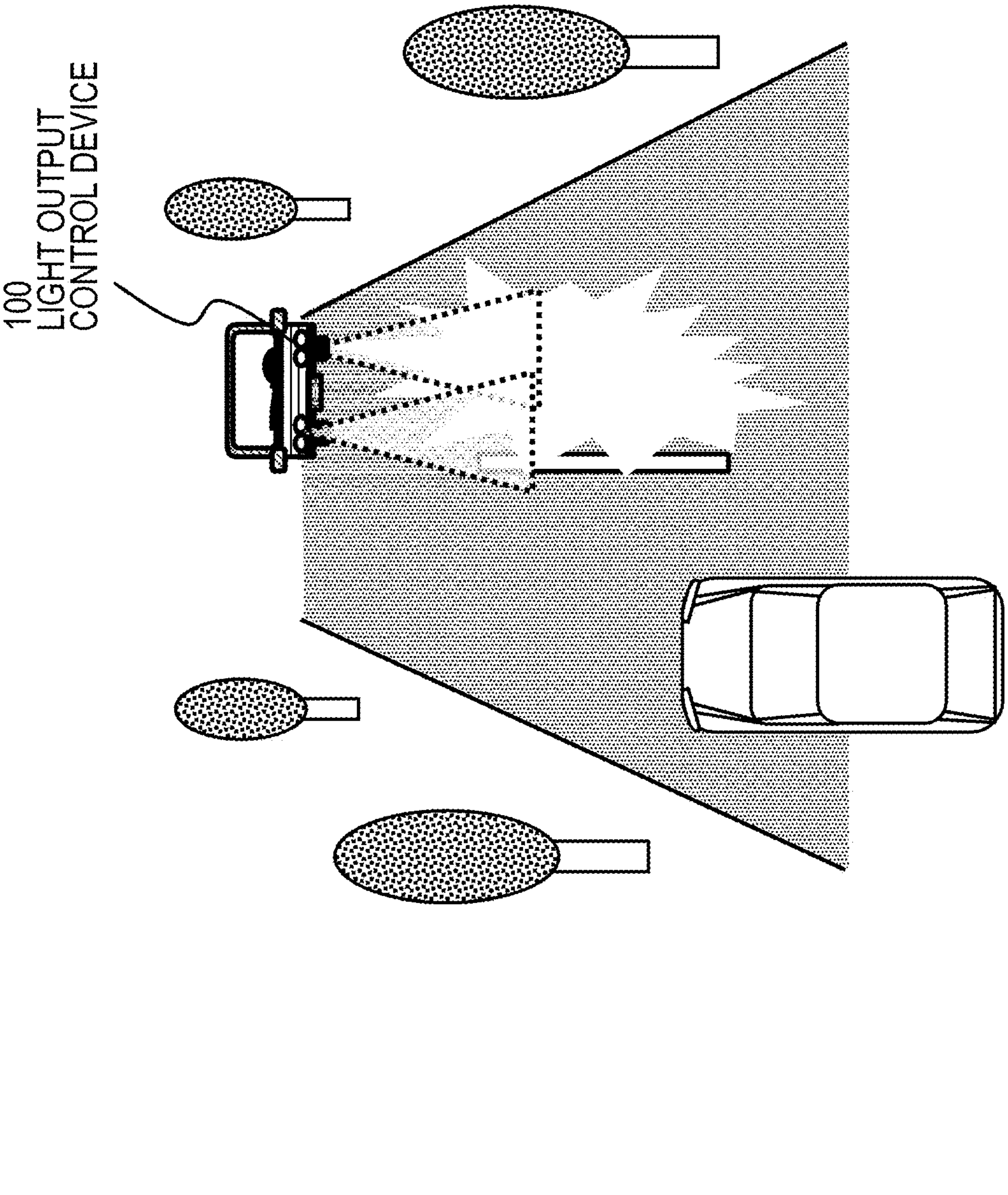
FIG. 34 is a view illustrating a glare phenomenon caused by headlights of an oncoming vehicle reflected by a road surface due to nighttime rain.

For example, FIG. 34 is a view illustrating a glare phenomenon caused by headlights of an oncoming vehicle reflected by a road surface due to nighttime rain.

Glare is a phenomenon such as dazzling caused by suddenly seeing bright light, and is a factor for causing an accident.

Such a phenomenon is a factor that prevents recognition not only in human vision but also robot vision.

The light output control device of the present disclosure is used as a headlight of a vehicle, an image of the situation in a vehicle traveling direction is captured with a camera, and light output is controlled on the basis of analysis of the captured image. For example, in a case where it is judged that it is in an environment where road surface reflection occurs due to nighttime rain, it is possible to perform control such as changing the direction of applied light or shortening the ON period as a blinking pattern, and this control enables control without causing the driver of the oncoming vehicle to feel dazzle.

7. Hardware Configuration Example of Light Output Control Device

Next, a hardware configuration example of the light output control device 100 of the present disclosure described with reference to FIG. 7 will be described.

Figure 35:
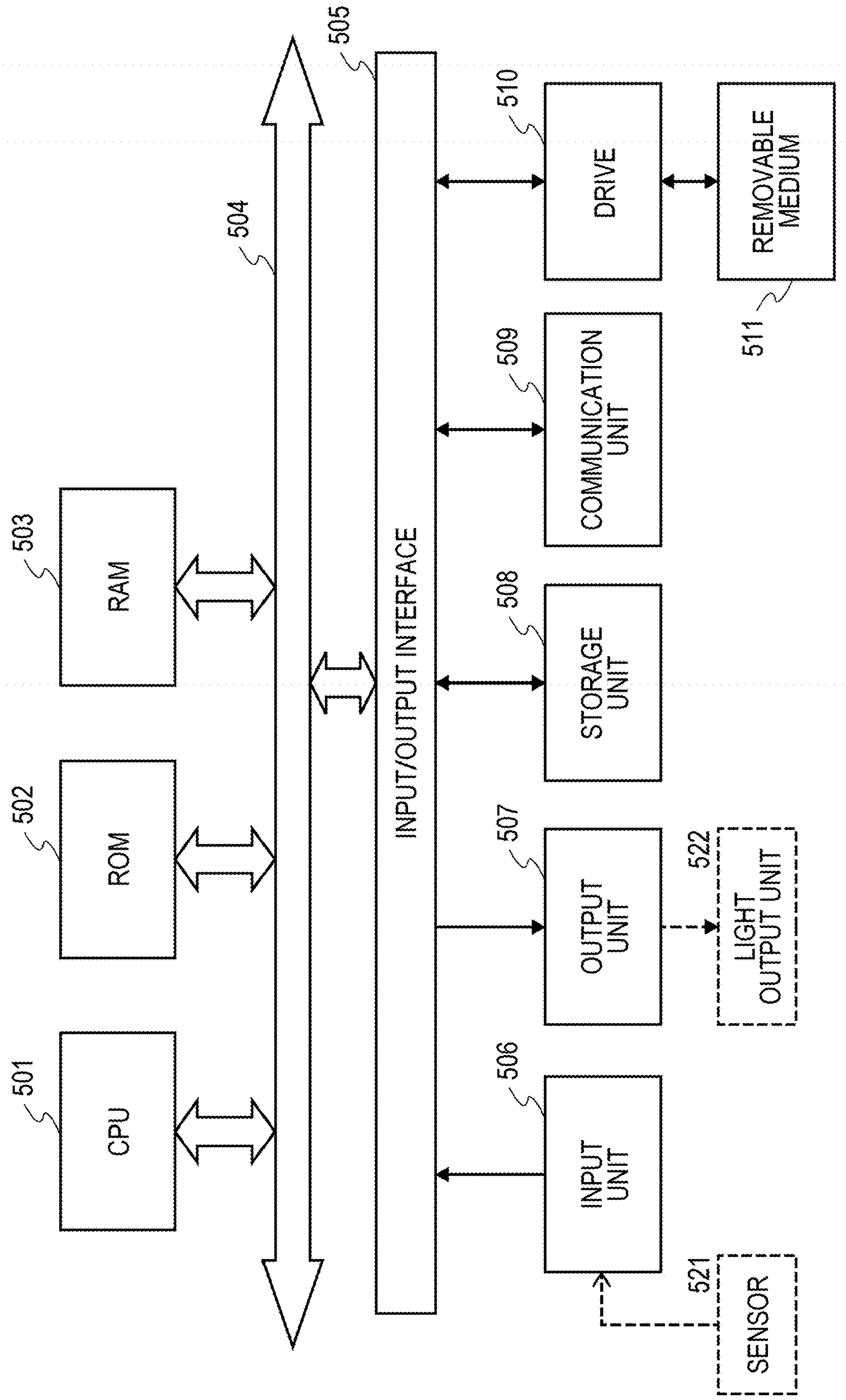
FIG. 35 is a diagram illustrating an example of a hardware configuration of the light output control device of the present disclosure.

FIG. 35 is a diagram illustrating an example of the hardware configuration of the light output control device 100 described with reference to FIG. 7.

Hereinafter, the hardware configuration illustrated in FIG. 35 will be described.

A central processing unit (CPU) 501 functions as a data processing unit that executes various processes according to a program stored in a read only memory (ROM) 502 or a storage unit 508. For example, processes according to the sequence described in the above-described embodiments are executed. A random access memory (RAM) 503 stores a program executed by the CPU 501, data, and the like. The CPU 501, the ROM 502, and the RAM 503 are mutually connected by a bus 504.

The CPU 501 is connected to an input/output interface 505 via a bus 504, and an input unit 506 including various switches, a touch panel, a sensor 521 including a camera, and the like, and an output unit 507 including a light output unit 522 and the like are connected to the input/output interface 505.

The CPU 501 executes various processes on the basis of sensor detection information and the like input from the input unit 506. Furthermore, control and the like of the output unit 507 are executed according to the processing result.

The storage unit 508 connected to the input/output interface 505 includes, for example, a hard disk, and the like and stores a program executed by the CPU 501 and various data. A communication unit 509 functions as a data communication transmitting/receiving unit via a network such as the Internet or a local area network, and communicates with an external device.

A drive 510 connected to the input/output interface 505 drives a removable medium 511 such as a magnetic disk, an optical disk, a magneto-optical disk, or a semiconductor memory such as a memory card to record or read data.

8. Conclusion of Configuration of Present Disclosure

Hereinabove, the embodiments according to the present disclosure have been described in detail with reference to the specific embodiments. However, it is self-evident that a person skilled in the art can modify or substitute the embodiment without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present Description can take the following configurations.

(1) A light output control device including:

a data analysis unit that performs data analysis based on sensor input information;

a processing determination unit that determines at least one of a light application region or a light output timing of output light of a light output unit on the basis of an analysis result of the data analysis unit; and a control unit that controls the light output unit according to at least one of the light application region or the light output timing determined by the processing determination unit and executes a light output process.

(2) The light output control device according to (1) further including a communication unit that performs a communication process with another light output control device, in which the data analysis unit executes data analysis by using reception information from another device input via the communication unit.

(3) The light output control device according to (2), in which the reception information from the another device includes at least one of sensor detection information of the another device or a data analysis result in the another device.

(4) The light output control device according to (2) or (3), in which the processing determination unit determines at least one of a light application region or a light output timing of output light of the light output unit on the basis of an analysis result that the data analysis unit generates by using the reception information from the another device.

(5) The light output control device according to any one of (1) to (4), in which the data analysis unit analyzes an occlusion region which no applied light reaches on the basis of the sensor input information, and the processing determination unit determines a light application region for eliminating or reducing the occlusion region.

(6) The light output control device according to (5), in which the data analysis unit analyzes an occlusion region which no applied light reaches on the basis of the sensor input information and reception information from another device input via a communication unit.

(7) The light output control device according to any one of (1) to (6), in which the data analysis unit executes analysis of an application region of mobile device applying light output from a mobile device on the basis of the sensor input information, and the processing determination unit determines a region not overlapping the application region of the mobile device applying light to be a light application region.

(8) The light output control device according to (7), in which the data analysis unit analyzes the application region of the mobile device applying light on the basis of the sensor input information and reception information from another device input via a communication unit.

(9) The light output control device according to (7) or (8), in which the control unit controls a light application region from the light output unit by mask processing.

(10) The light output control device according to any one of (1) to (9), in which the data analysis unit analyzes a blinking pattern of mobile device applying light output from a mobile device on the basis of the sensor input information, and the processing determination unit determines a light output timing of the light output unit on the basis of the blinking pattern of the mobile device applying light.

(11) The light output control device according to (10), in which the processing determination unit determines the light output timing such that light output from the light output unit is performed during an output stop period of the mobile device applying light on the basis of the blinking pattern of the mobile device applying light.

(12) The light output control device according to (10) or (11), in which the data analysis unit analyzes the blinking pattern of the mobile device applying light on the basis of the sensor input information and reception information from another device input via a communication unit.

(13) The light output control device according to any one of (1) to (12), in which the control unit outputs a blinking pattern signal that can be used as a clock signal from the light output unit.

(14) The light output control device according to (13), in which the control unit outputs from the light output unit a blinking pattern signal that can be used as a master clock signal applicable to a synchronization process with another device.

(15) The light output control device according to any one of (1) to (14), in which the control unit outputs texture pattern light from the light output unit.

(16) The light output control device according to (15), in which the control unit executes a process of correcting distortion of texture pattern light output from the light output unit.

(17) A light output control method executed in a light output control device, the method including:

a data analysis step of causing a data processing unit to perform data analysis based on sensor input information;

a processing determination step of causing the data processing unit to determine at least one of a light application region or a light output timing of output light of a light output unit on the basis of an analysis result in the data analysis step; and a light output control step of causing the data processing unit to control the light output unit according to at least one of the light application region or the light output timing determined in the processing determination step and to execute a light output process.

(18) A program causing a light output control process to be executed in a light output control device, the program causing a data processing unit to execute:

a data analysis step of performing data analysis based on sensor input information;

a processing determination step of determining at least one of a light application region or a light output timing of output light of a light output unit on the basis of an analysis result in the data analysis step; and a light output control step of controlling the light output unit according to at least one of the light application region or the light output timing determined in the processing determination step and causing a light output process to be executed.

Note that a series of processes described in the Description can be executed by hardware, software, or a combined configuration of the both. In a case where processing by software is executed, a program in which a processing sequence is recorded can be installed and executed in a memory in a computer incorporated in dedicated hardware, or the program can be installed and executed in a general-purpose computer capable of executing various types of processing. For example, the program can be recorded in advance in a recording medium. In addition to being installed on a computer from a recording medium, the program can be received via a network such as a local area network (LAN) or the Internet and installed on a recording medium such as an internal hard disk.

Furthermore, the various kinds of processing described in the Description is not necessarily performed sequentially in the orders described in the Description, and may be performed simultaneously or individually according to the processing capacity of a device that executes the processing or as necessary. Furthermore, in the present Description, a system is a logical set configuration of a plurality of devices, and is not limited to a system in which devices of respective configurations are in the same housing.

INDUSTRIAL APPLICABILITY

As described above, according to a configuration of an embodiment of the present disclosure, a device and a method are realized that execute light output control that eliminates an occlusion region and does not disturb blinking pattern light of a mobile device.

Specifically, for example, at least one of a light application region or a light output timing of output light of the light output unit is determined on the basis of a data analysis result based on sensor input information and reception information from another device, the light output unit is controlled according to the light application region or the light output timing that has been determined, and a light output process is executed. Specifically, for example, light output control is executed so as to eliminate an occlusion region which no light reaches due to a pillar or the like, and moreover, so as not to disturb blinking pattern light output from the mobile device.

According to the present configuration, a device and a method are realized that execute light output control that eliminates an occlusion region and does not disturb blinking pattern light of the mobile device.

REFERENCE SIGNS LIST

10 Traveling surface
20 Illumination
30 Autonomous traveling robot
100 Light output control device
101 Camera
102 Infrared camera
103 Flicker detection sensor
104 Communication unit
105 Data processing unit
106 Light output unit
110 Data analysis unit
111 Occlusion region (shadow region) analysis unit
112 Robot applying light analysis unit
120 Processing determination unit
121 Light application region determination unit
122 Light output timing determination unit
130 Control unit
131 Light application region control unit
132 Light output timing control unit
133 Output pattern image correction unit
170 Light output control system
180 Light output control server
201 Sensor
202 Data processing unit
203 Robot driving unit
211 Sensor detection signal analysis unit
212 Sensor control signal generating unit
213 Sensor control unit
214 Robot drive signal generating unit
220 Robot control server
250 Robot control system
300 Drone
501 CPU
502 ROM
503 RAM
504 Bus
505 Input/output interface
506 Input unit
507 Output unit
508 Storage unit
509 Communication unit
510 Drive
511 Removable medium
521 Sensor
522 Light output unit

The invention claimed is:

1. A light output control device comprising:
data analysis circuitry configured to perform data analysis based on sensor input information;
processing determination circuitry configured to
analyze an occlusion region which no applied light reaches on a basis of the sensor input information, and
determine a light application region for eliminating or reducing the occlusion region based on an analysis result of the data analysis circuit; and
control circuitry configured to control the light application region determined by the processing determination circuitry and execute a light output process.

2. The light output control device according to claim 1 further comprising
communication circuitry configured to perform a communication process with another light output control device,
wherein the data analysis circuitry executes data analysis by using reception information from another device input via the communication circuitry.

3. The light output control device according to claim 2, wherein the reception information from the another device includes at least one of sensor detection information of the another device or a data analysis result in the another device.

4. The light output control device according to claim 2, wherein the processing determination circuitry
determines at least one of the light application region or the light output timing of the output light of the light output unit on a basis of an analysis result that the data analysis circuitry generates by using the reception information from the another device.

5. The light output control device according to claim 1, wherein the data analysis circuitry is further configured to
analyze an occlusion region which no applied light reaches on a basis of the sensor input information and reception information from another device input via a communication circuitry.

6. The light output control device according to claim 1, wherein the data analysis circuitry is configured to
analyze the application region of the mobile device applying light on a basis of the sensor input information and reception information from another device input via a communication circuitry.

7. The light output control device according to claim 6, wherein the control circuitry is further configured to
control a light application region from the light output unit by mask processing.

8. The light output control device according to claim 1,
wherein the data analysis circuitry is further configured to
analyze a blinking pattern of mobile device applying light output from a mobile device on a basis of the sensor input information, and
the processing determination circuitry is further configured to
determine a light output timing of the light output unit on a basis of the blinking pattern of the mobile device applying light.

9. The light output control device according to claim 8, wherein the processing determination circuitry
determines the light output timing such that light output from the light output unit is performed during an output stop period of the mobile device applying light on a basis of the blinking pattern of the mobile device applying light.

10. The light output control device according to claim 8, wherein the data analysis circuitry is further configured to analyze the blinking pattern of the mobile device applying light on a basis of the sensor input information and reception information from another device input via a communication circuitry.

11. The light output control device according to claim 1, wherein the control circuitry is further configured to output a blinking pattern signal that can be used as a clock signal from the light output unit.

12. The light output control device according to claim 11, wherein the control circuitry is further configured to output from the light output unit a blinking pattern signal that can be used as a master clock signal applicable to a synchronization process with another device.

13. The light output control device according to claim 1, wherein the control circuitry is further configured to output a texture pattern light from the light output unit.

14. The light output control device according to claim 13, wherein the control circuitry is further configured to execute a process of correcting distortion of texture pattern light output from the light output unit.

15. A light output control method executed in a light output control device, the method comprising:

causing a data processing circuitry to perform data analysis based on sensor input information;

causing the processing determination circuitry to analyze an occlusion region which no applied light reaches on a basis of the sensor input information, and determine a light application region for eliminating or reducing the occlusion region on a basis of an analysis result provided by the data analysis circuitry; and causing control circuitry to control a light output unit according to the light application region previously determined and execute a light output process.

16. A non-transitory computer readable medium have a storage that has a program stored therein that when executed by processing circuitry causes the processing circuitry to implement a light output control method, the method comprising:

causing a data processing circuitry to perform data analysis based on sensor input information;

causing the processing determination circuitry to analyze an occlusion region which no applied light reaches on a basis of the sensor input information, and determine a light application region for eliminating or reducing the occlusion region on a basis of an analysis result provided by the data analysis circuitry; and causing control circuitry to control a light output unit according to the light application region previously determined and execute a light output process.

* * * * *